(12) United States Patent
Aoi et al.

(10) Patent No.: US 6,440,601 B1
(45) Date of Patent: Aug. 27, 2002

(54) BATTERY PACK

(75) Inventors: Takayuki Aoi, Hirakata; Takeshi Inui, Yao; Yukihiro Gotanda, Kadoma; Daisuke Yoshida, Moriguchi; Takae Okazaki, Osaka, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/623,465

(22) PCT Filed: Jan. 31, 2000

(86) PCT No.: PCT/JP00/00525

§ 371 (c)(1),
(2), (4) Date: Sep. 13, 2000

(87) PCT Pub. No.: WO00/46865

PCT Pub. Date: Aug. 10, 2000

(30) Foreign Application Priority Data

Feb. 1, 1999 (JP) ............................. 11-023550
Dec. 22, 1999 (JP) ............................. 11-363666

(51) Int. Cl.⁷ ................................................ H01M 2/10
(52) U.S. Cl. ............................. 429/96; 429/98; 429/99; 429/100
(58) Field of Search ........................ 429/96, 99, 100, 429/98

(56) References Cited

U.S. PATENT DOCUMENTS 4,319,178 A * 3/1982 Sugalski ....................... 320/2
5,437,938 A * 8/1995 Mitsui et al. ................... 429/1

FOREIGN PATENT DOCUMENTS

| EP | 084338 | 7/1983 | |
| EP | 821420 | 1/1998 | |
| EP | 875948 | 11/1998 | |
| FR | 0084338 | * 1/1983 | ............ H01M/2/10 |
| JP | 10-69892 | 3/1998 | |

OTHER PUBLICATIONS

RadioShack, BH–242A battery holder, catalog #27–390, Jun. 6, 1996.*

English Language abstract of JP–10–69892.

* cited by examiner

*Primary Examiner*—Patrick Ryan
*Assistant Examiner*—Angela J. Martin
(74) *Attorney, Agent, or Firm*—Greenblum & Bernstein, P.L.C.

(57) ABSTRACT

A plurality of cells are disposed in close contact with each other with their longitudinal axes parallel to each other, and their electrode terminals that are juxtaposed at one end are electrically connected to each other with a connector piece. These cells thus joined together are inserted into and held within a frame body formed in one-piece with a pair of end face covers, connecting bar, and retaining piece, or alternatively, inserted into and held within a cell casing having a pair of end face covers, bottom wall, and partition boss formed integrally therewith.

17 Claims, 14 Drawing Sheets

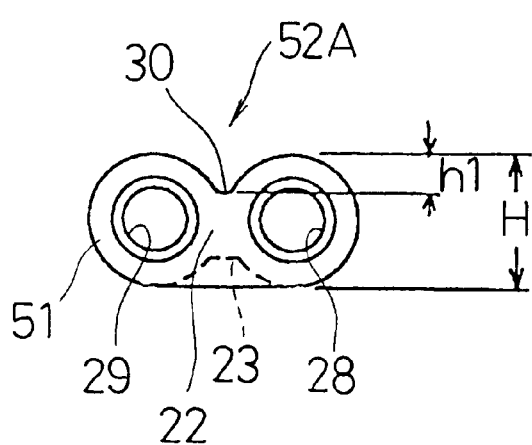
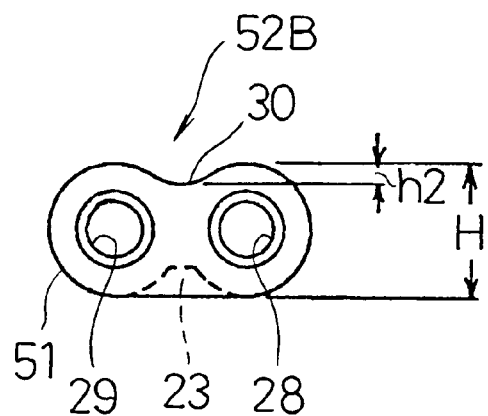
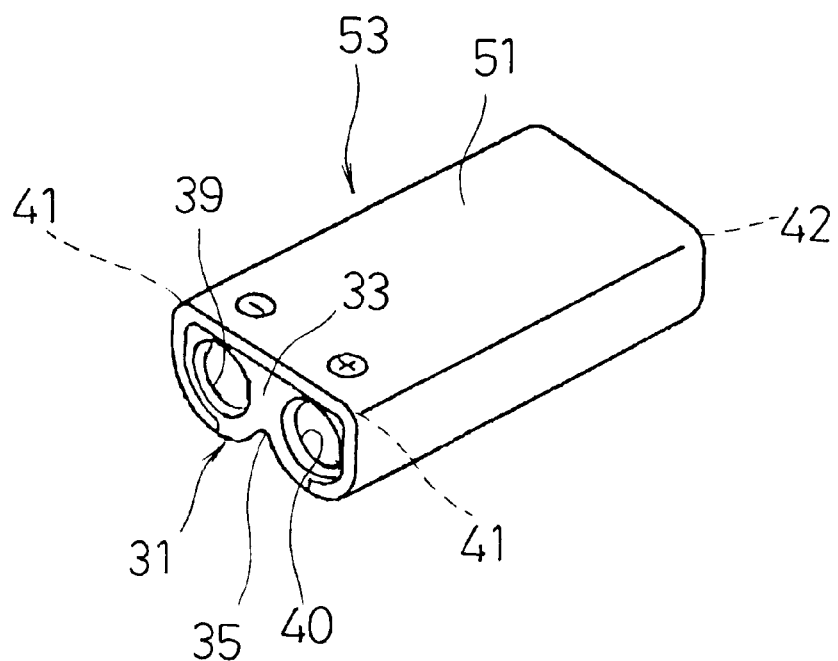

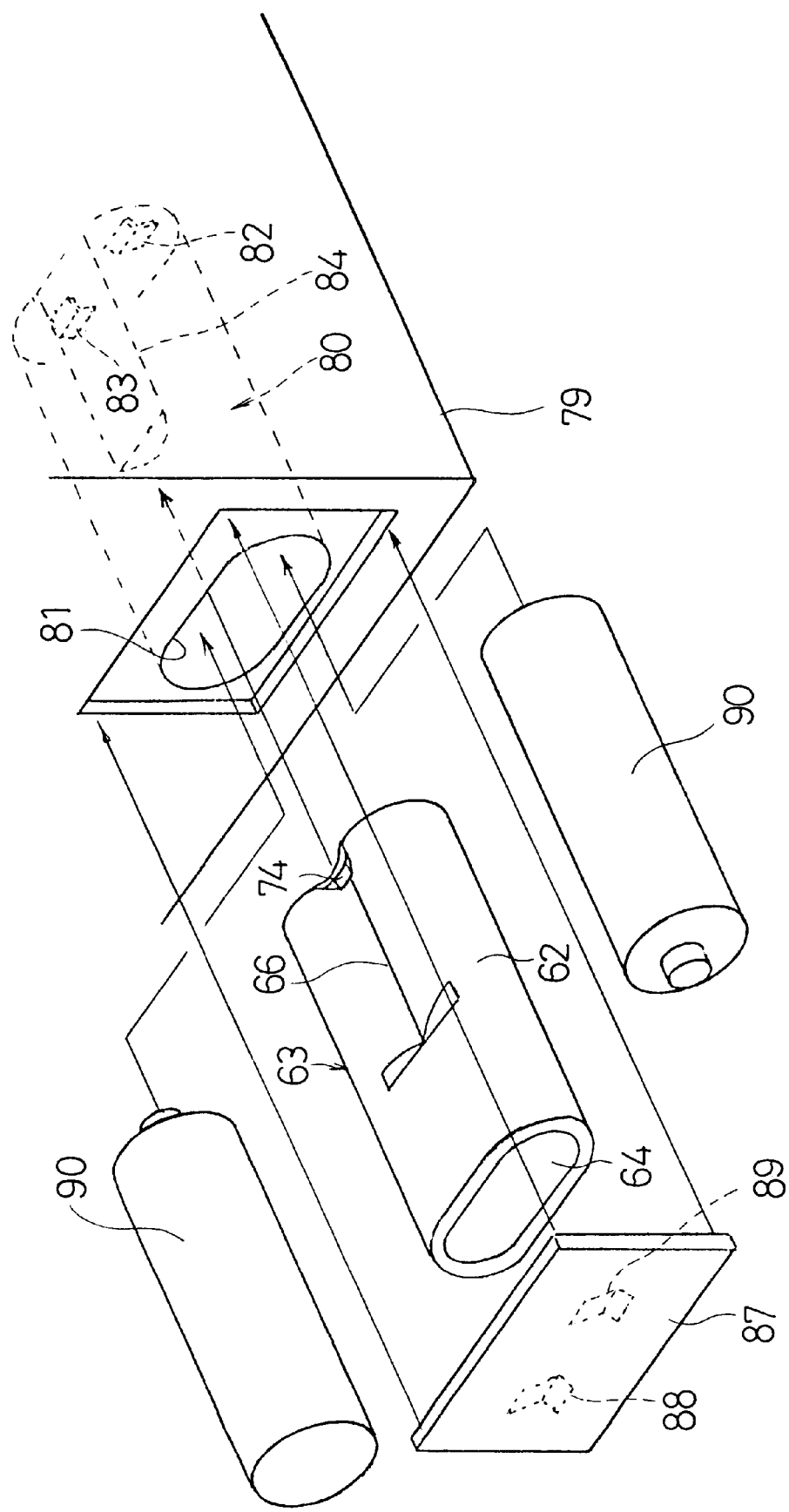

BATTERY PACK

This application is a 371 of PCT/JP00/00525.

TECHNICAL FIELD

The present invention relates to a packed battery wherein a plurality of single cells are combined and joined together so that they can be handled more easily as a single battery of a predetermined shape with certain voltage required for respective applications.

BACKGROUND ART

Battery has its own specified voltage value that differs corresponding to the type of battery. Similarly, the size of battery, as well as dischargeable current value and electric capacity, are defined for each type of batteries. It is, however, often the case that the voltage and current values that are required for certain applications are different from those of a battery available on the market. It is thus customary practice to connect a plurality of batteries in series or in parallel so as to obtain voltage or current of required value.

Packed battery, that has been developed for the purpose of simplifying the handling of a plurality of batteries used in combination as described above, enables a plurality of batteries to be used as a single battery in accordance with various applications by joining them together in a predetermined shape, and has been widespread in recent years. Such packed battery is disclosed, for example, in Japanese Unexamined Published Patent Application No. 10-69892.

FIG. 23 is an exploded perspective view of such packed battery. Two cells 1, 2 such as nickel-cadmium battery are disposed in close contact with each other with their respective longitudinal axes parallel to each other and with their respective positive and negative terminals arranged opposite from each other. The positive terminal and the negative terminal that are adjacent with each other at one end of these cells 1, 2 are electrically connected with a positive temperature coefficient (PTC) element 3, while input/output terminals 4, 7 are respectively attached to the positive terminal and the negative terminal juxtaposed at the other end of the cells 1, 2. The two cells 1, 2 that are thus connected to each other are then united by means of a frame body 10 comprising an upper end plate 8 and a lower end plate 9. That is, by bringing each of retaining plates 11, 12 into contact with both ends of the two cells 1, 2 in a lengthwise direction, the distal ends of support pieces 13, 14 provided in pairs respectively to both of the end plates 8, 9 are abutted with each other, and this abutted portion of the two pairs of support pieces 13, 14 are joined together by ultrasonic welding. The two cells 1, 2 are thus united in a state of being sandwiched between both retaining plates 11, 12 of the integrated frame body 10.

The input/output terminals 4, 7 attached respectively to each of the united cells 1, 2 are exposed to the outside through windows 17, 18 formed in the upper end plate 8 for being electrically connected to outside terminals. A labeling sheet 19 is then wrapped around and bonded to the peripheries of the respective cells 1, 2 united by the frame body 10, thereby completing the packed battery. The packed battery constituted as described above is highly durable against vibration or shock as compared to a packed battery that is merely covered with a label consisting of a heat-shrinkable synthetic resin tube with a lead connector connected to the cells. Furthermore, it has an advantage over a packed battery that is housed in a casing of synthetic resin in that it is small-sized, light-weighted, and inexpensive.

However, the packed battery described above has a large number of components, and its assemblage involves complicated processes such as abutting the distal ends of the respective pairs of support pieces 13, 14 formed in the separate upper and lower end plates 8, 9 of the frame body 10 and bonding them by ultrasonic welding. The number of assembling steps is large and the cost is high accordingly. Furthermore, in case there is variation in length or other features of each support piece 13, 14 in the above described packed battery, these support pieces 13, 14 will be connected to each other in a misaligned state. If this happens, the two cells 1, 2 cannot be united at predetermined relative positions without any play therebetween. The yield of packed batteries may thus be decreased.

Apart from the above, the packed battery described above has the following drawback. As long as the packed batteries such as the one described above are produced solely for a specific purpose in which the number of cells 1, 2 to be connected and the way in which they are packed together are limited to one type of packed battery, no inconvenience will arise. However, if several types of packed batteries that have the same appearance but different specifications such as output voltage are fabricated by, for example, connecting two lithium cells in series and in parallel and sold, needs will arise for providing features for distinguishing one type of battery from another and for preventing misuse of the packed battery. The above-described packed battery is given no consideration for preventing complications in this regard.

In the case of manufacturing and selling several types of packed battery, it is necessary to indicate the differences in specifications such as output voltage of the battery by some characters or designs. Moreover, the packed battery should have a construction such as to prevent a user from using a packed battery of wrong specification by mistake, or such as to make the user realize the mistake immediately so that an electric appliance for which the packed battery is used will not be damaged.

Specifically, if a packed battery with a specification of 6V output voltage in which two lithium cells of 3V terminal voltage are connected in series is used by mistake for an electric appliance for which a packed battery with a specification of 3V output voltage in which the cells are connected in parallel should be used as a power source, it is quite likely that the electric appliance is damaged. Thus the packed battery must be provided with a construction that never fails to prevent such misuse. On the other hand, if a packed battery of 3V output voltage is used for an appliance that requires 6V voltage as a power source, the appliance cannot fully perform its function, and therefore, the packed battery must also have such features as to make the user of the battery to realize that the battery is a wrong type and should not be used in the appliance the user wishes to use.

With the above described problems in prior art in view, an object of the present invention is to provide a packed battery that can be manufactured in a predetermined shape in a high yield at a low cost by reducing the number of components and the number of assembling process steps, and that is provided with features for preventing misuse between packed batteries of different specifications or reverse connection of the packed battery.

DISCLOSURE OF THE INVENTION

In order to achieve the above objects, the present invention according to one aspect thereof provides a packed battery comprising a plurality of cells joined together in series- or parallel-connection and arranged with their axes parallel to each other and their external surfaces in proximity to or in contact with each other, and with their juxtaposed electrode terminals electrically connected to each other at least at one end with a connector piece. A frame body into which said cells are mounted includes a pair of first and second end face covers that respectively cover the entire surface of end faces of the adjacent cells at both ends, a connecting bar for connecting said pair of end face covers opposed to each other at a space corresponding to a length of the cells, and a retaining piece that is shorter than the connecting bar and is provided to the first end face cover to protrude parallel to the connecting bar, all of which end face covers, connecting bar, and retaining piece are formed in one piece. The cells are held at their lengthwise ends by the end face covers and at their widthwise sides by the connecting bar and the retaining piece, thereby being retained in the frame body.

In this packed battery, since the frame body is formed in one piece, the number of components is reduced as compared to the frame body of a conventional packed battery. Furthermore, a plurality of cells that are joined together can be mounted into the frame body by one-touch operation utilizing resiliency of one end face cover and the retaining piece provided thereto, i.e., since no complicated processes such as welding while positioning both cells are required, the number of assembling process is reduced, and the production cost is accordingly decreased. Moreover, since the frame body is molded in one piece and its configuration is defined uniformly by the molding, no variation occurs in configuration unlike in the conventional frame body that is assembled by connecting several components. The cells can thus be held at predetermined positions in relation to each other and joined together in the frame body without any play, whereby the yield of the packed battery can be increased.

Preferably, the first end face cover should have a thin portion in which the connector piece attached to one end of the cells fits in, and the second end face cover should have a plurality of terminal windows for allowing the electrode terminals of the cells to be exposed to the outside. Further, both of the connecting bar and the retaining piece should have a cross section such that they can fit in a concavity between the adjacent cells, and the retaining piece should have a length ⅓ to ½ of the connecting bar. By the presence of the thin portion, the first end face cover exhibits resiliency and allows the retaining piece to readily deform, whereby the cells joined together can be smoothly mounted into the frame body.

It is preferable that the first end face cover be formed ellipsoidal in shape while the second end face cover be formed substantially in the shape of letter B having a dent in conformity with the external shape of one end of the cells joined together. Further, the dent should have a depth that varies corresponding to an output voltage specification of the packed battery. Misuse of packed batteries of different specifications can thereby be prevented by providing a corresponding guide rail that matches the depth of the dent in the end face cover to a battery holder of an electric appliance in which the packed battery is used. For example, troubles such as damage to electric appliance caused by misuse of a 6V packed battery in an electric appliance that requires 3V drive power source can be prevented.

In the above described packed battery, the retaining piece may also have a length that varies corresponding to an output voltage specification of the packed battery. By providing a corresponding guide rail that matches the length of the retaining piece to a battery holder of an electric appliance in which the packed battery is used, the retaining piece can prevent insertion of a wrong packed battery by abutting the distal end of the guide rail in the battery holder.

The above described packed battery may be constituted such that all of the cells are arranged in a same direction with their positive terminals juxtaposed and electrically connected to each other by a positive connector piece welded to the positive terminals, and with their negative terminals electrically connected to each other by a negative connector piece welded to the negative terminals, an insulating tape is affixed on the positive connector piece, and a positive terminal piece that is electrically connected to the positive connector piece and a negative terminal piece having a same thickness as that of the positive terminal piece and being electrically connected to the negative connector piece through an interconnecting member are bonded on the insulating tape affixed on the positive connector piece. With this arrangement, while the cells are arranged all in the same direction and connected in parallel, the positive terminal and negative terminal of the cells can be arranged on an identical plane at one end of the cells. Since this configuration defines the direction of insertion, the packed battery allows itself to be readily exchanged by a user while being a parallel-connection packed battery.

Specifically, the positive terminal piece is integrally formed to the positive connector piece such as to be bendable relative to the positive connector piece, while the negative terminal piece communicates with the negative connector piece through the interconnecting member such that the interconnecting member extends from the negative connector piece in an orthogonal direction and the negative terminal piece is continuously formed to the distal end of the interconnecting member such as to be bendable relative thereto. The positive terminal piece and the negative terminal piece are respectively bent so as to be bonded on the insulating tape that is affixed on the positive connector piece. The packed battery wherein the cells are connected in parallel, while the positive and negative terminals are arranged on the identical side can thereby be assembled with a reduced number of components.

It is preferable that an adhesive be applied to both sides of the insulating tape in advance, so that both of the terminal pieces can readily be positioned and bonded at predetermined locations.

It is also possible to construct the above described packed battery such that the cells are arranged in opposite directions. In this case, connector pieces of a positive terminal connecting member are respectively welded to each of the positive terminals of the cells for electrically connecting them. These connector pieces are provided to both ends of an interconnecting line in electrical contact therewith. Meanwhile, a negative terminal connecting member is welded at both ends to the negative terminals of each of the cells. Thereby, while the cells are arranged in opposite directions and connected in parallel, the positive terminal and negative terminal of the cells can be arranged on an identical plane at one end of the cells. Since this configuration defines the direction of insertion, the packed battery allows itself to be readily exchanged by a user while being a parallel-connection packed battery.

The above described packed battery can also be constituted such that the cells are not covered with an outer tube, and the both ends of the negative terminal connecting member are welded to the exterior surface of the cell casing of each cell. Thereby, unfinished cells in a normal cell production process can be used to produce packed batteries, thus decreasing the cost further.

In the above described packed battery, a heat-sensitive or heat-shrinkable outer label may be wound around and bonded to the exterior surface of the cells and the frame body except a part from the distal end of the retaining piece in the first end face cover to the second end face cover. An indentation formed between the adjacent cells can be thereby utilized in combination with the guide rail in the battery holder of the electric appliance as the features for distinguishing packed batteries of different specifications, i.e., the guide rail is guided along the indentation formed between the cells, and prevents insertion of a wrong battery by abutting the distal end of the retaining piece.

It is also possible to constitute the above described packed battery such that the frame body includes a first support piece integrally formed to the distal end of the retaining piece of the first end face cover such as to be stepped and thinner than the retaining piece so as to fit in a concavity between the adjacent cells. Further, a second support piece is integrally formed to the second end face cover opposite the first support piece such as to fit in the concavity between the adjacent cells. A heat-sensitive or heat-shrinkable outer label is wound around and bonded to the entire exterior surface of the cells and the frame body. The outer label is formed with slits so that it fits to the exterior shape of the cells and that a portion of the outer label corresponding to a part of the cells from the distal end of the retaining piece in the first end face cover to the second end face cover is supported by the first support piece and the second support piece. While the cells and the frame body can be securely joined together by wrapping the outer label around the entire exterior surface thereof, an indentation can be formed between the first and second support pieces, whereby packed batteries of different specifications are distinguished from one another.

Alternatively, first outer label of heat-shrinkable material may be wound around and bonded to the exterior surface of the cells and the frame body except a part from the distal end of the retaining piece in the first end face cover to the second end face cover, and a second outer label of non-heat-shrinkable material may be wound around and bonded to the part from the distal end of the retaining piece in the first end face cover to the second end face cover. Thereby, since the second outer label does not deform even in a high temperature atmosphere, the indentation that is formed in a portion where the second outer label is bonded can be maintained. Apart from the above, if a material that shrinks at a predetermined temperature is used for the second outer label, it can be used as a temperature sensor of the packed battery, whereby a packed battery that has been exposed to a predetermined temperature atmosphere can be detected.

The packed battery according to a second aspect of the present invention comprises a plurality of cells joined together in series- or parallel-connection and arranged with their axes parallel to each other and their external surfaces in proximity to or in contact with each other, and with their juxtaposed electrode terminals electrically connected to each other at least at one end with a connector piece. A cell casing into which said cells are mounted includes a pair of first and second end face covers that respectively cover the entire surface of end faces of the adjacent cells at both ends, a bottom wall that connects said pair of end face covers opposed to each other at a space corresponding to a length of the cells, and a partition boss projected on the bottom wall along a lengthwise direction thereof, all of which end face covers, bottom wall, and partition boss are formed in one piece. The cells are placed upon the bottom wall along the partition boss and held at their lengthwise ends by the end face covers, thereby being retained in the cell casing.

In this packed battery, since the cell casing is formed in one piece, the number of components is reduced as compared to a conventional packed battery. Furthermore, a plurality of cells that are joined together can be mounted into the cell casing simply by inserting them from above, the number of assembling process is reduced, and the production cost is accordingly decreased. Moreover, since the cell casing is molded in one piece and its configuration is defined uniformly by the molding, no variation occurs in configuration unlike in the conventional frame body that is assembled by connecting several components. The cells can thus be held at predetermined positions in relation to each other and joined together in the cell casing without any play, whereby the yield of the packed battery can be increased.

The second end face cover of the above described packed battery should preferably have a plurality of terminal windows for allowing electrode terminals of the cells to be exposed to the outside, and the partition boss should preferably have a cross section such that it can fit in a concavity between the adjacent cells, whereby a plurality of cells can be stably held in the cell casing.

The above described packed battery may be constituted such that the first end face cover is formed substantially in the shape of letter B having a dent in conformity with the external shape of one end of the cells joined together, the dent having a depth that varies corresponding to an output voltage specification of the packed battery, while the second end face cover is formed substantially in the shape of letter D, and both of the end face covers have one linear side where they are connected with each other through the bottom wall, said linear side of the end face covers being formed with square projections at both ends thereof. In combination with a corresponding guide rail that matches the depth of the dent and that may be provided to the battery holder of an electric appliance in which this packed battery is used, misuse of a wrong packed battery can be prevented. By forming the opening shape of the battery insertion hole of the battery holder in conformity with the square projections of the end face covers, it can be made certain that misuse of a wrong packed battery is prevented.

It is also possible to constitute the above described packed battery such that the cells are arranged in opposite directions, circular terminal plates of identical shape are respectively welded to the electrode terminals juxtaposed to each other at one end of the cells at locations offset from the center of the cells, while the electrode terminals juxtaposed to each other at the other end of the cells are electrically connected with each other by a connector piece welded thereto, and the second end face cover of the cell casing has non-circular terminal windows formed therein at locations opposite each of the circular terminal plates. The use of identical terminal plate for both of the positive and negative terminals of the cells in fabrication of series-connection packed batteries reduces material cost, as well as increases the speed of welding operation, since the circular terminal plate needs not be positioned in a certain direction.

In the above described packed battery, a partition piece may be integrally formed between the terminal windows, whereby the adjacent terminal plates or electrode terminals are prevented from being short-circuited by a metal piece or the like during fabrication process.

The above described packed battery may also employ the construction wherein a heat-sensitive or heat-shrinkable outer label is wound around and bonded to the entire exterior surface of the cells and the cell casing, whereby the cells and the cell casing can be securely joined together.

BRIEF DESCRIPTION OF THE DRAWINGS

FIGS. 7A and 7B are left side elevation views respectively showing different types of packed batteries provided with misuse prevention features in the case of fabricating packed batteries with different specifications;

FIG. 8 is a perspective view showing a packed battery according to a second embodiment of the present invention;

FIG. 15 is a perspective view showing the above packed battery and a battery holder;

BEST MODE FOR CARRYING OUT THE INVENTION

Figure 1:
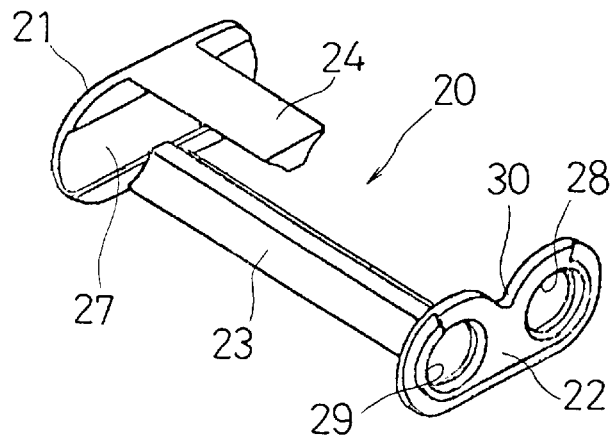
FIG. 1 is a perspective view showing a frame body from one end thereof that is used in a packed battery according to a first embodiment of the present invention.
Figure 2:
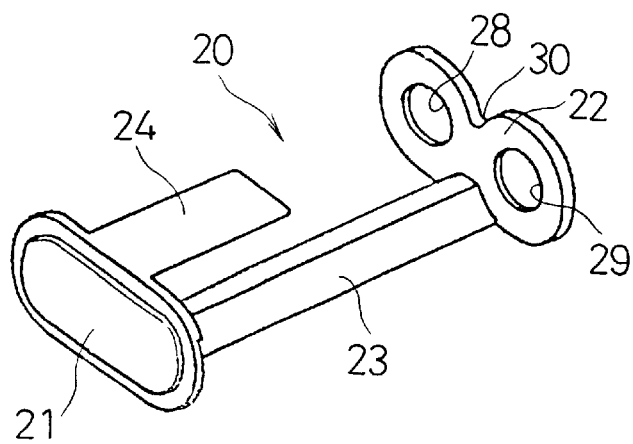
FIG. 2 is a perspective view showing the same frame body from the other end thereof.

Preferred embodiments of the present invention are hereinafter described with reference to the accompanying drawings. FIG. 1 is a perspective view showing a frame body 20 from one end thereof that is used in a packed battery according to a first embodiment of the present invention, and FIG. 2 is a perspective view showing the same frame body 20 from the other end thereof. This frame body 20 comprises a first and a second end face covers 21, 22, a connecting bar 23, and a retaining piece 24, that are all monolithically formed of, for example, ABS resin.

The first end face cover 21 is formed ellipsoidal in shape so that it can cover both end faces of two adjacent cylindrical cells (not shown) when they are disposed in parallel in close contact with each other. The first end face cover 21 is formed with a thin portion 27 of substantially rectangular shape along its lengthwise direction on a surface opposed to the second end face cover 22. The second end face cover 22 also has a shape such as to cover the end faces of both of the two adjacent cylindrical cells similarly to the first end face cover 21, but is formed substantially in the shape of letter B. That is, one of the longer sides (upper side in the figure) and both of the shorter sides are shaped in conformity with the shape of end faces of the two cylindrical cells. The upper longer side has a dent 30 while the other longer side is formed linearly. A pair of terminal windows 28, 29 are formed in the second end face cover 22 for allowing each of the electrode terminals of two cylindrical cells to be exposed to the outside.

The connecting bar 23 connects the opposite first and the second end face covers 21, 22 at a space corresponding to the length of the cylindrical cells in the middle portion of their longer sides. The connecting bar 23 has a substantially trapezoidal cross section so that it can fit into a concavity formed by the outer peripheries of two cylindrical cells in close contact with each other. The retaining piece 24 protrudes from the middle portion of the first end face cover 21 at the upper longer side opposite from the connecting bar 23 and extends parallel to the connecting bar 23. The length of the retaining piece 24 is about one third of the space between both end face covers 21, 22, and the cross section thereof is substantially trapezoidal so that the retaining piece 24 can fit into the concavity between the two closely contacted cylindrical cells on the other side of the connecting bar 23.

Figure 3:
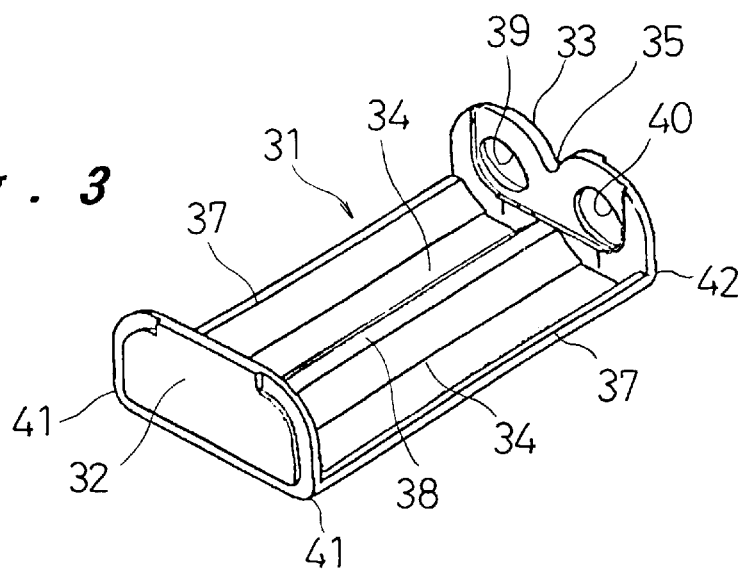
FIG. 3 is a perspective view showing a cell casing from one end thereof that is used in a packed battery according to a second embodiment of the present invention.

FIG. 3 is a perspective view showing a cell casing 31 from one end thereof that is used in a packed battery according to a second embodiment of the present invention. The cell casing 31 has a first and a second end face covers 32, 33, a bottom wall 34, a partition boss 38, and side walls 37 that are all monolithically formed of, for example, ABS resin, in such a shape that it can contain two cylindrical cells therein.

The bottom wall 34 has a length and width such that two parallel-arranged and closely contacted cylindrical cells can be placed thereon. In the middle in the widthwise direction of this bottom wall 34, the rail-like partition boss 38 is formed to protrude upwardly along a lengthwise direction. The partition boss 38 has a trapezoidal cross-section so that it can fit in the concavity formed by the outer peripheries of two closely contacted cylindrical cells on the under side. The cylindrical cells are thus respectively held on both sides with the partition boss 38 and the both side walls 37.

The first end face cover 32 is formed substantially in the shape of letter D so that it can cover both of the end faces of two adjacent cylindrical cells juxtaposed in close contact with each other. The second end face cover 33, on the other hand, has its one longer side (upper side in the figure) shaped in conformity with the external shape of two cylindrical cells, with a dent 35 formed in the middle thereof, and further has a pair of terminal windows 39, 40 for allowing each of the adjacent electrode terminals of both cylindrical cells to be exposed to the outside. While the end face covers 21, 22 of the frame body 20 of the first embodiment are curved along an arc at both ends of the lower longer side, the first and second end face covers 32, 33 of this cell casing 31 are formed with square edges 41, 42 protruded respectively at both ends of their linearly shaped lower longer sides.

Figure 4:
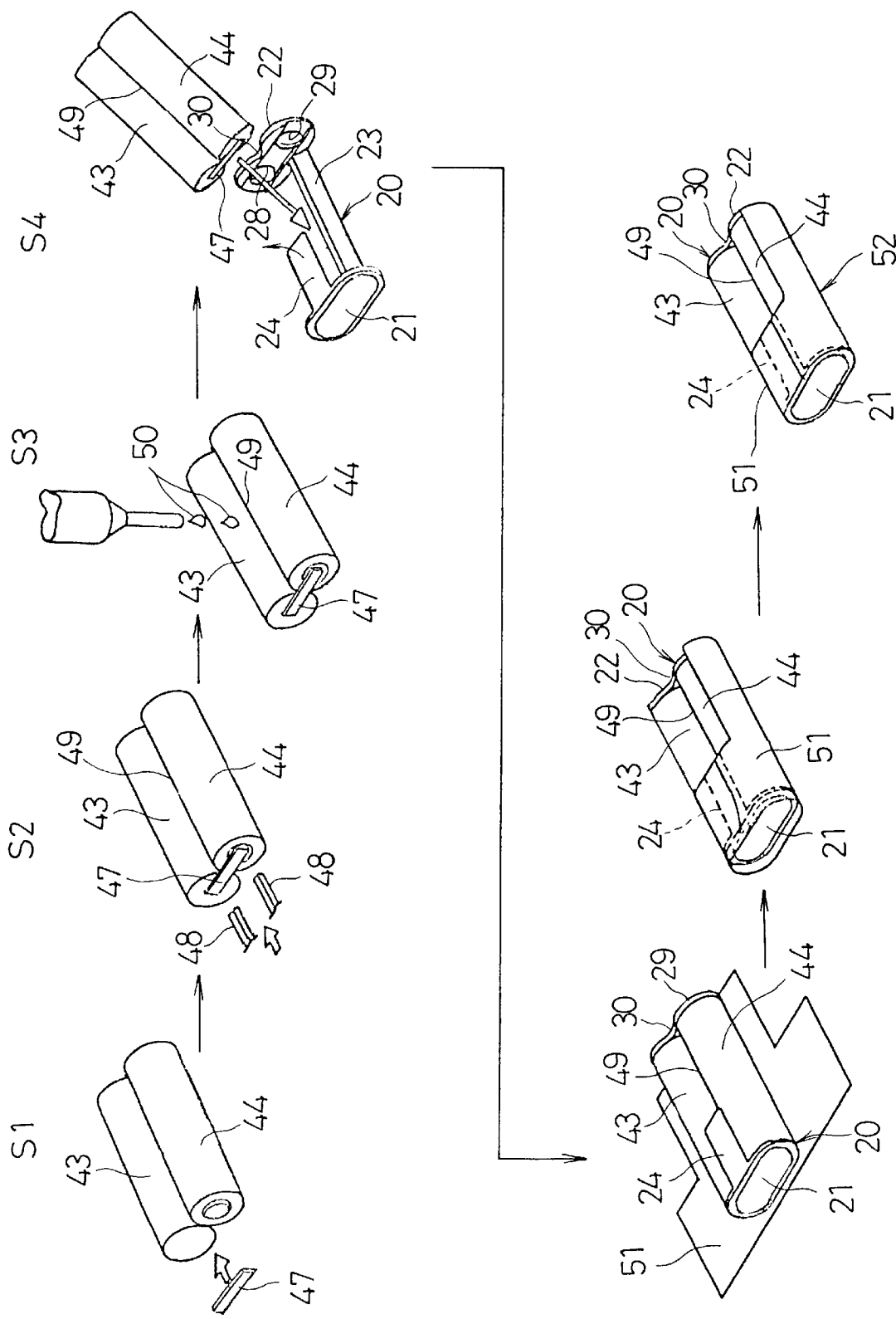
FIG. 4 is a perspective view showing the fabrication process steps of the packed battery of the first embodiment.

Next, the fabrication process steps of the first embodiment packed battery constituted with the frame body 20 shown in FIGS. 1 and 2 will be described with reference to FIG. 4. In this packed battery, two cells are connected in series and fixed together using the frame body 20. First, two cylindrical lithium cells 43, 44 of, for example, size AA are arranged side by side with a slight gap therebetween with their respective longitudinal axes parallel to each other and with their respective electrode terminals arranged opposite from each other such that both of their end faces are positioned on an identical plane (S1). Both ends of an electric connector piece 47 are attached to the positive and negative terminals juxtaposed at one end of two cells 43, 44 and welded thereto by spot welding using welding electrodes 48, 48. Thereby, the adjacent positive and negative terminals of both cells 43, 44 are electrically connected to each other (S2).

Next, a small amount of instantaneous adhesive 50 is dropped onto the opposed portion 49 of the outer peripheries of the cells 43, 44 so that the cells are fixed at predetermined relative positions (S3). The cells 43, 44 affixed together are then mounted in the frame body 20 by being inserted between the connecting bar 23 and the retaining piece 24 from the end where the electric connector piece 47 is attached (S4). At this time, both cells push the retaining piece 24 upwards as they are inserted, causing the first end face cover 21 to warp sidewards at its thin portion 27 and the retaining piece 24 to slightly deform upwards. Thus the cells 43, 44 are fitted in between the end face covers 21, 22 smoothly. When the cells are mounted in the frame body 20, the electric connector piece 47 fits into the thin portion 27 of the first end face cover 21, while the retaining piece 24 and the connecting bar 23 with trapezoidal cross sections respectively fit into the upper and lower gaps 49 formed by the outer peripheries of two cells 43, 44. Accordingly, the cells 43, 44 are sandwiched between the connecting bar 23 and the retaining piece 24 from upper and lower sides and are thereby held in the frame body 20 at predetermined positions relative to each other.

Figure 23:
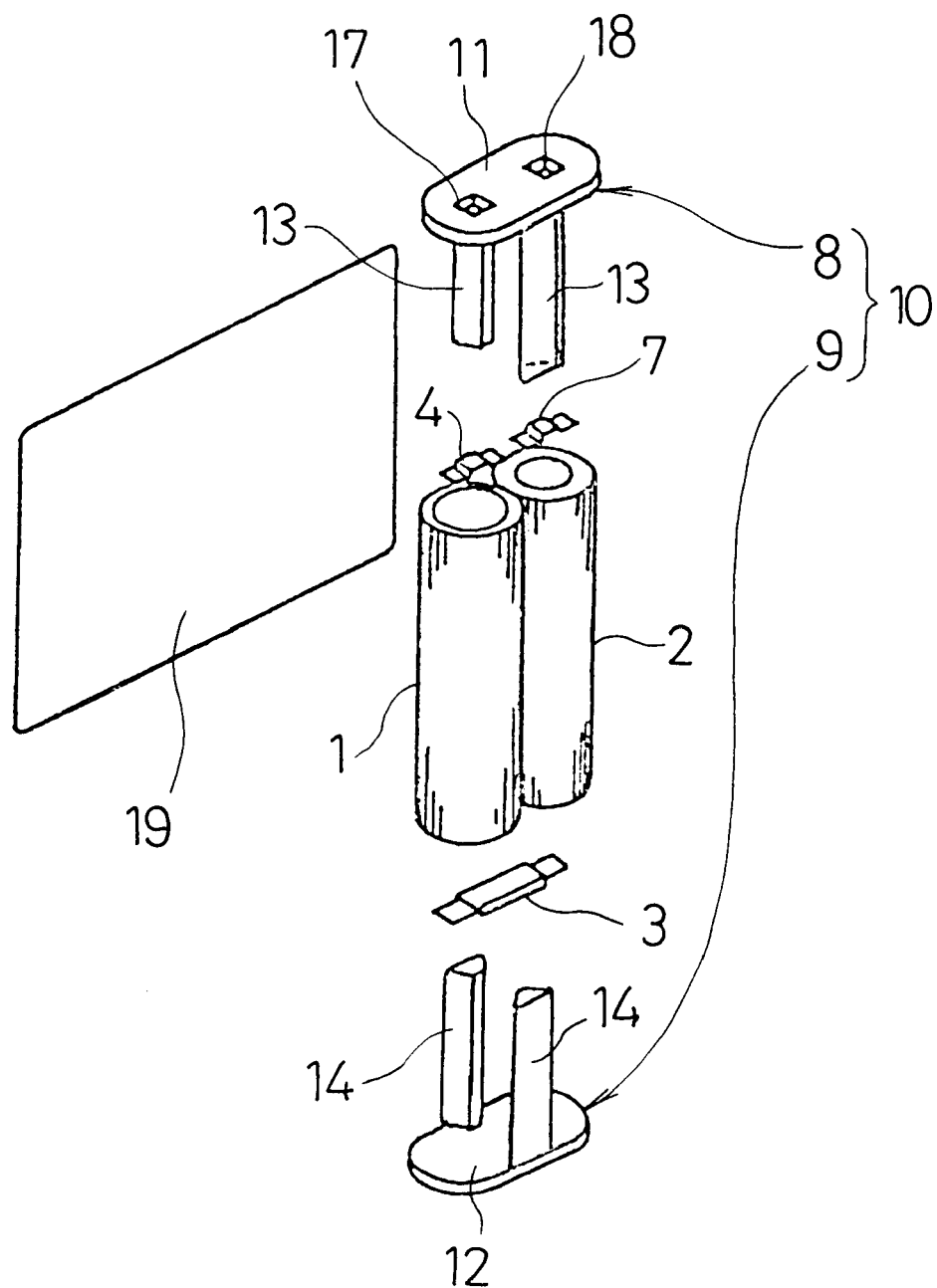
FIG. 23 is an exploded perspective view of a conventional packed battery.

Since the frame body 20 is formed in one piece, it has much fewer number of components as compared to the conventional frame body 10 shown in FIG. 23. Also, the cells 43, 44 can be mounted into the frame body 20 by one-touch operation with the use of resiliency of the first end face cover 21 and retaining piece 24, involving no complicated process such as welding while positioning the cells. Furthermore, the number of assembly process steps can be decreased and the production cost can be accordingly reduced. The frame body 20 is molded in one piece of resin material and its configuration is defined uniformly by the molding. Therefore, no variation occurs in configuration unlike in the conventional frame body 10 that is assembled by connecting two components. Two cells 43, 44 can thus be held at prescribed positions in relation to each other and joined together in the frame body without any play, whereby the yield of the packed battery can be increased.

Successively, an outer label 51 made of an electrically non-conductive resin film is heated at a low temperature of about 90° C. so that an adhesive that has been applied to one surface of the label in advance exhibits adhesion. The frame body 20 in which both cells 43, 44 have been mounted is placed at a certain location in the middle of the outer label 51 (S5), and the outer label 51 is wrapped around the outer peripheries of both cells 43, 44 from both sides (S6).

As can be seen from the figure at S5, the outer label 51 has a length slightly greater than the length of the frame body 20, and is formed in a square convex shape wherein the portion corresponding to the part of the frame body 20 from the first end face cover 21 to the tip of the retaining piece 24 has a greater width than the other portion. The frame body 20 with the cells 43, 44 mounted therein is placed on the outer label 51 such that both ends of the label extend from the both end face covers 21, 22 by substantially the same length. When the outer label 51 is wrapped around the frame body 20, as can be seen from the figure at S6, both ends of the outer label 51 protrude by a fixed length from both end face covers 21, 22, and the entire periphery of the portion from the first end face cover 21 to the tip of the retaining piece 24 is enfolded with the outer label 51, while part of the portion from the second end face cover 22 to the tip of the retaining piece 24 is exposed to the outside.

Figure 5:
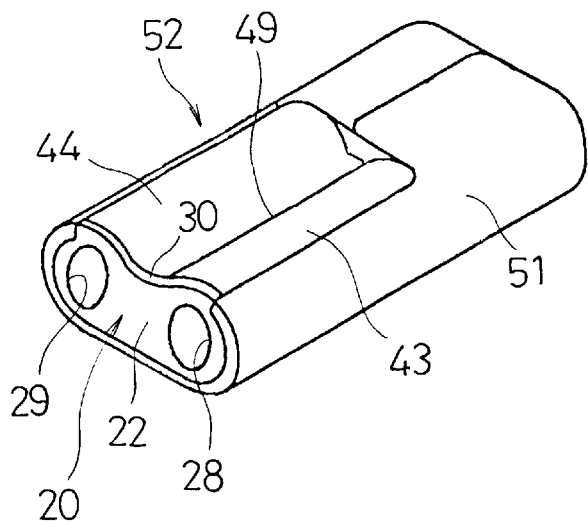
FIG. 5 is a perspective view showing the packed battery fabricated through the process steps shown in FIG. 4.
Figures 6A, 6C, 6D:
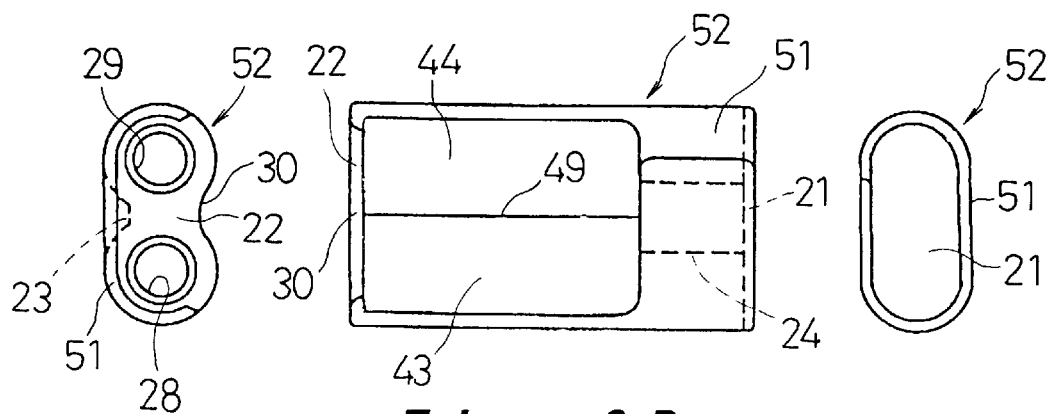
FIGS. 6A–6D are a plan view, front view, left side elevation view, and right side elevation view of the above packed battery.
Figure 6B:
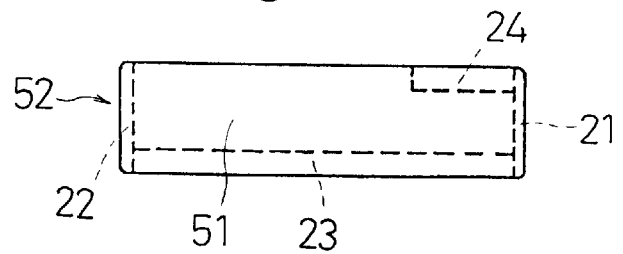

The outer label 51 is then heated again at a high temperature of about 180° C., thereby shrinking both in lengthwise and widthwise directions, so that its protruded edges fit closely to the peripheral edges of the both end face covers 21, 22. The outer label 51 thus joins the cells 43, 44 and the frame body 20 together firmly, thereby completing the packed battery 52. FIG. 5 is a perspective view showing the packed battery 52 produced through the above process steps, and FIGS. 6A–6D are a plan view, front view, left side elevation view, and right side elevation view of this packed battery 52. This packed battery 52 comprises two cylindrical cells 43, 44 connected in series through the electrical connector piece 47. The positive terminal of one cell 43 and the negative terminal of the other cell 44 are exposed to the outside respectively through the terminal windows 28, 29 in the second end face cover 22 so as to be connectable to terminals of an electric appliance for which the packed battery is used.

The packed battery 52 constructed as described above will have an output voltage of 3V if two 1.5V cylindrical cells are used, and will have 6V output voltage if cells of 3V output voltage are used. In the case of manufacturing and selling several types of packed batteries with different output voltage specifications, it is necessary to provide a feature for preventing misuse of wrong type of packed battery. The above described packed battery 52 allows such feature to be readily provided thereto.

FIGS. 7A and 7B respectively show a packed battery 52A with a 3V output voltage and a packed battery 52B with a 6V output voltage, that are both fabricated through the process steps described above with reference to FIG. 4. Both of them have the same height H, while the dent 30 in the second end face cover 22 of the 3V packed battery 52A has a depth h1 of, for example, 4 mm, and the dent 30 of the 6V packed battery 52B has a depth h2 of, for example, 2 mm.

Meanwhile, the electric appliances for which each of the packed batteries 52A, 52B is used have battery holders that are provided with a guide rail inside thereof, of which cross section conforms to the dent 30 of the second end face cover of each packed battery 52A, 52B. That is, the battery holders, at the end inside thereof, have respective guide rails with cross sections such as to fit in the dent 30 with the depth of h1 and h2, respectively. Therefore, if a packed battery 52B with a 6V output voltage is mistakenly inserted into the electric appliance that needs 3V packed battery 52A as a power source, the second end face cover 22 with the dent 30 of a depth h2 of 2 mm abuts the guide rail inside of the battery holder that has a cross section projecting with a thickness of 4 mm, whereby the packed battery 52B is prevented from being completely inserted into the battery holder. It is thus impossible to mount a packed battery with a 6V output voltage into an electric appliance that is driven by a 3V power source, and the user can readily realize the mistake and will stop attempting to mount it immediately. It can be made certain that the electric appliance is prevented from being damaged by misuse of a 6V packed battery 52B.

However, with the above described feature for preventing misuse by the differences in depth of the dent 30, it is still possible to mount a 3V output voltage packed battery 52A into an electric appliance that needs 6V power source. In this case, the electric appliance cannot fully perform its function. This problem can be addressed by changing the length of the retaining piece 24 of the above packed battery 52 in two ways. The frame body 20 of the 3V output voltage packed battery 52A may be provided with a retaining piece 24 of, for example, 23 mm length, while the frame body 20 of the 6V output voltage packed battery 52B may be provided with a slightly shorter retaining piece 24 of, for example, 20 mm. In this case, the outer label 51 is formed in the square convex shape respectively corresponding to the length of each of the retaining pieces 24 so that it is wrapped all around the retaining piece 24. The resultant packed batteries 52A, 52B thus have portions with different lengths where the outer label 51 is not wrapped around the cells 43, 44.

Meanwhile, the electric appliances for which each of the packed batteries 52A, 52B is used have battery holders that are respectively provided with a guide rail inside thereof, which is formed in cross section such as to fit into the gap 49 between two cells 43, 44 with a length so that the guide rail contacts the retaining piece 24 of the packed battery 52A or 52B when the packed battery is completely inserted into the battery holder. Therefore, if a packed battery 52A with a 3V output voltage is mistakenly inserted into the electric appliance that needs 6V packed battery 52B as a power source, the guide rail inside of the battery holder first fits in the gap between the cells 43, 44 and guides the packed battery, but stops further insertion of the packed battery 52A when the tip of the guide rail abuts the retaining piece 24, whereby the packed battery 52A is prevented from being completely inserted into the battery holder. It is thus impossible to mount a packed battery with a 3V output voltage into an electric appliance that is driven by a 6V power source, and the user can readily realize the mistake and will stop attempting to mount it thereof immediately. Malfunction of the electric appliance can be therefore prevented.

Since the battery holder is usually provided with a contact terminal at one end inside thereof, the packed battery 52A or 52B cannot be connected to the electric appliance unless it is inserted from the side of the second end face cover 22 that has a pair of terminal windows 28, 29. The above described packed battery 52A or 52B does not allow itself to be inserted from the opposite side because its first end face cover 21 is not provided with a dent 30. That is, the packed battery 52A or 52B has also a feature for preventing reverse insertion thereof.

FIG. 8 is a perspective view showing a packed battery 53 of a second embodiment of the present invention constituted with a cell casing 31 shown in FIG. 3. This packed battery 53 is fabricated through similar process steps to those shown in FIG. 4. The only difference in the process steps is that at step 4 (S4) in FIG. 4, instead of inserting the cells 43, 44 that have been joined together in a predetermined positional relationship between the connecting bar 23 and the retaining piece 24 of the frame body 20 in the first embodiment, the cells 43, 44 are inserted respectively into two cavities formed by the partition boss 38, the bottom wall 34, and the side walls 37 on both sides. This packed battery 53 comprises two cells 43, 44 connected in series and joined together similarly to the packed battery 52 of the first embodiment.

Since the cell casing 31 of this packed battery 53 is monolithically formed, it has much fewer number of components as compared to the conventional packed battery. Also, the cells 43, 44 can be mounted into the cell casing 31 simply by inserting them from above. The number of assembly process steps can be decreased and the production cost can be accordingly reduced. Furthermore, the cell casing 31 is molded in one piece of resin material and its configuration is defined uniformly by the molding. Therefore, no variation occurs in configuration unlike in the conventional frame body 10 that is assembled by connecting two components. Two cells 43, 44 can thus be held at prescribed positions in relation to each other and joined together in the cell casing without any play, whereby the yield of the packed battery can be increased.

The differences in output voltage specification of the above described packed battery 53 can be recognized by changing the depth of the dent 35 in the second end face cover 33. Furthermore, this packed battery 53 can be distinguished from the packed battery 52 of the first embodiment by the presence of the square edges 41, 42. That is, it can be made even more certain that misuse of a packed battery of wrong output voltage specification is prevented, by fabricating packed batteries of one specification in the form of one of the first and second embodiments of the present invention, and of the other specification in the form of the other one of the first and second embodiments.

Next, a packed battery according to a third embodiment of the present invention will be described with reference to FIG. 9 through FIG. 15. The above described packed batteries 52, 53 according to the first and second embodiments comprise two series-connected cylindrical cells 43, 44, in which both positive and negative electrode terminals for achieving electrical connection with the electrical appliance can be readily disposed on an identical plane at one end of the cells. The packed battery according to the third embodiment, while it comprises two cylindrical cells that are connected in parallel, also allows the positive and negative terminals to be arranged adjacent with each other on an identical plane, so that the user can exchange packed batteries with ease. That is, it is not practical to construct a packed battery such that the positive and negative electrode terminals to be connected with the electrical appliance are disposed at opposite ends of the packed battery, since the mounting of such packed battery would be complicated and the packed battery could be wrongly inserted.

Figure 9:
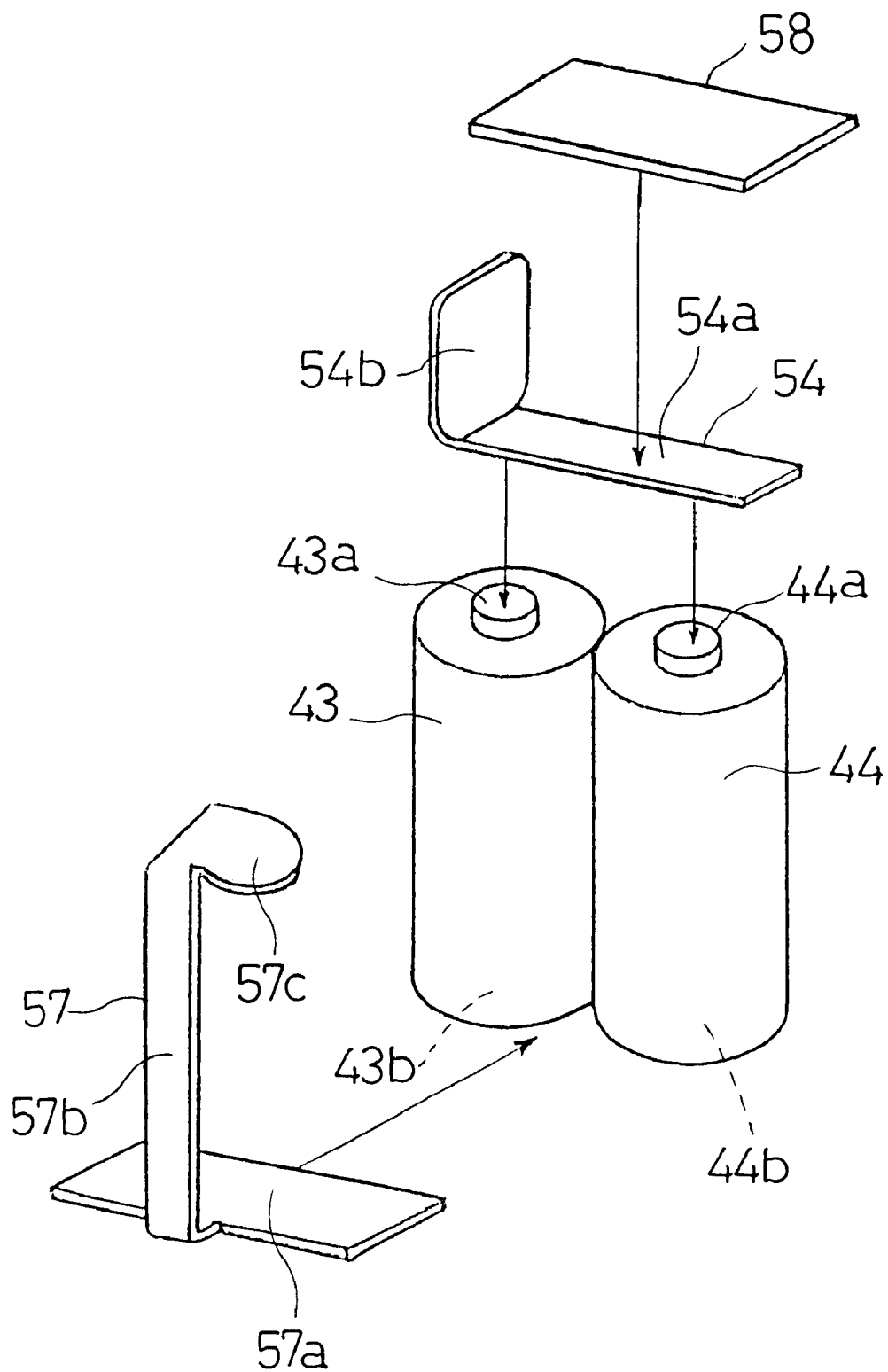
FIG. 9 is a perspective view showing a first construction for connecting and fixing two cylindrical cells in parallel in the packed battery according to a third embodiment of the present invention.

FIG. 9 is a perspective view of a packed battery according to the third embodiment, showing a first construction for fixing two cylindrical cells 43, 44 that are connected in parallel and arranged at predetermined positions relative to each other such that the positive and negative terminals are juxtaposed with each other on an identical plane at one end of the cells. The fixing and connecting mechanism comprises a positive connecting terminal plate 54, a negative connecting terminal plate 57, and an insulating tape 58.

The positive connecting terminal plate 54 comprises a rectangular connector piece 54a for electrically connecting the positive terminals 43a, 44a of the two cylindrical cells that are disposed parallel to each other, with their positive terminals 43a, 44a and negative terminals 43b, 44b arranged in the same direction, and a terminal piece 54b of substantially square shape that extends orthogonally from one end of the connector piece 54a. The negative connecting terminal plate 57 comprises a rectangular connector piece 57a for electrically connecting negative terminals 43b, 44b of the two cylindrical cells 43, 44, an interconnecting piece 57b that extends orthogonally from the middle on one side of the connector piece 57a, and a terminal piece 57c that extends orthogonally from one end of the interconnecting piece 57b. Both of the positive connecting terminal plate 54 and negative connecting terminal plate 57 have a same uniform thickness, which is preferably set about 0.1 mm to 0.2 mm.

The insulating tape 58 is a both-sided adhesive tape in which an adhesive has been applied on both sides of a tape member made of an electrically non-conductive and non-ion-transmissive resin such as PET or PE. The thickness of the insulating tape 58 should preferably be 0.1 mm to 0.2 mm. Materials other than PET or PE can be used for the insulating tape 58 as long as it allows no ion transmission except paper, which causes migration.

Next, the process steps for fixing the two cylindrical cells 43, 44 in parallel arrangement in a predetermined positional relationship with each-other using the above described positive and negative connecting terminal plates 54, 57 and the insulating tape 58 will be described with reference to FIGS. 10A–10I. First, as shown in the plan view and the front view of FIGS. 10A and 10B, two cylindrical cells 43, 44 are disposed in the same direction with their longitudinal axes parallel to each other and with their positive terminals 43a, 44a and negative terminals 43b, 44b positioned on respectively identical planes, using a jig as required.

The connector piece 54a of the positive connecting terminal plate 54 is positioned and placed on the positive terminals 43a, 44a of the cells 43, 44 arranged as described above, and both ends of the connector piece 54a is spot-welded respectively at two locations to each of the positive terminals 43a, 44a with welding electrodes 48, 48 of a spot welder such as an inverter-type resistance welder. Next, as shown in the front view and the bottom view of FIGS. 10C and 10D, the connector piece 57a of the negative connecting terminal plate 57 is positioned with respect to the negative terminals 43b, 44b of both cells 43, 44 and attached thereto, and both ends of the connector piece 57b are spot-welded respectively at two locations to each of the negative terminals 43b, 44b with welding electrodes 48, 48. The two cells 43, 44 are thus connected in parallel and secured in a predetermined positional relationship with each other without using any adhesive or the like.

Figure 10A:
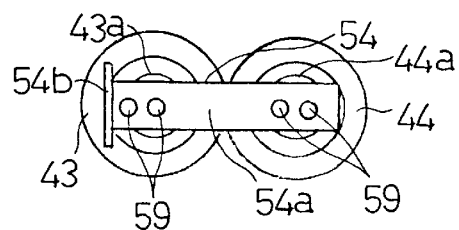
FIGS. 10A–10I are diagrams showing the process steps for fixing two cylindrical batteries connected in series at predetermined relative positions with the construction shown in FIG. 9.
Figure 10B:
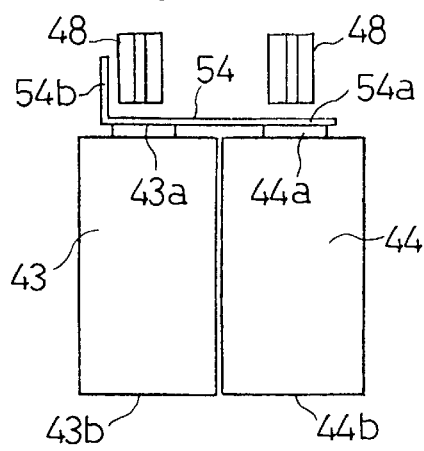
Figure 10E:
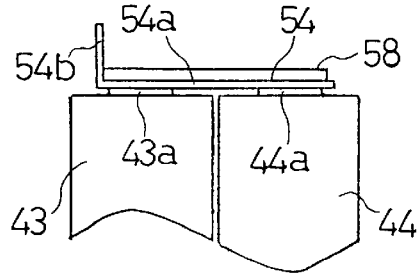

Next, as shown in the partial front view of FIG. 10E, the insulating tape 58 is affixed to the upper surface of the connector piece 54a of the positive connecting terminal-plate 54. Thereby, any traces 59 of spot welding left on the connector piece 54a as shown in FIG. 10A or welding burrs are covered with the insulating tape 58. As for the traces 60 of spot welding on the connector piece 57a of the negative connecting terminal plate 57, it is not necessary to cover them, since they are not exposed to the outside when assembled into a packed battery.

Figure 10F:
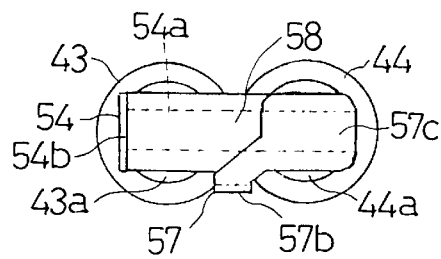
Figure 10G:
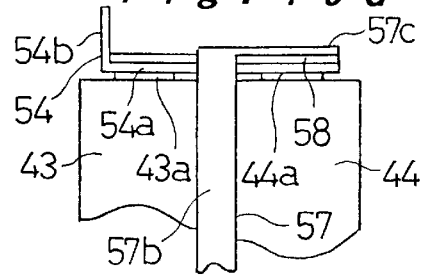
Figure 10C:
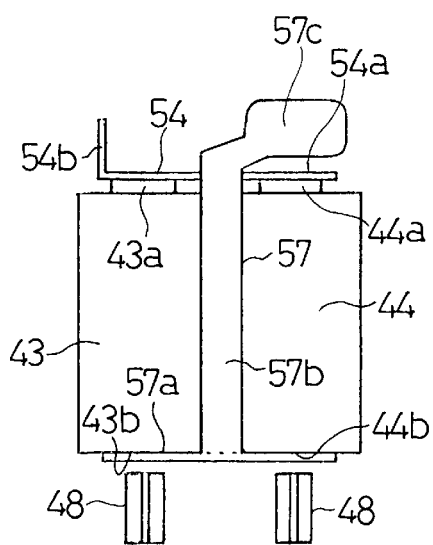
Figure 10D:
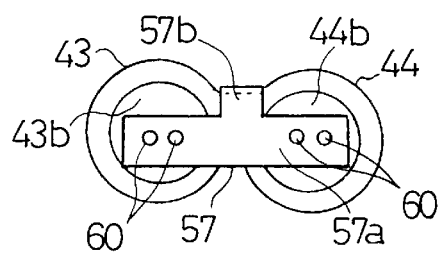
Figure 10H:
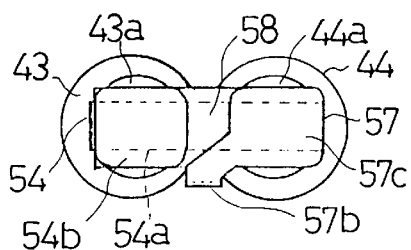
Figure 10I:
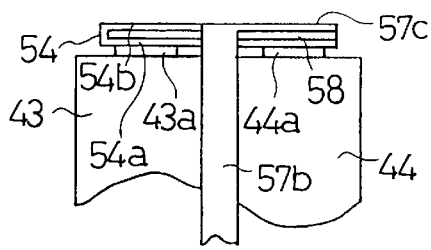

Then, as shown in the plan view and the partial front view of FIGS. 10F and 10G, the terminal piece 57c of the negative connecting terminal plate 57 is bent at right angles relative to the interconnecting piece 57b, and bonded to the insulating tape 58. Further, the terminal piece 54b of the positive connecting terminal plate 54 is bent at right angles relative to the connector piece 54a and bonded to the insulating tape 58 as shown in the plan view and the partial front view of FIGS. 10H and 10I.

In bending both terminal pieces 54b, 57c, since the terminal piece 57c of the negative connecting terminal plate 57 extends from the interconnecting piece 57b located in the middle of both positive terminals 43a, 44a and is relatively insecure as compared to the positive connecting terminal plate 54, it is bent and bonded to one side (right hand side in the figure) of the insulating tape 58 prior to the bending of the terminal piece 54b of the positive connecting terminal plate 54. Thereby, the positive and negative terminal pieces 54b, 57c are prevented from being short-circuited during the fabrication process steps. Although the negative connecting terminal plate 57 is bridged across both ends of the cells 43, 44 with the connector piece 57a and terminal piece 57c through the interconnecting piece 57b, since it is of the same polarity as that of the casing of the cells 43, 44, the cells will not be short-circuited even when the outer tube of the cells 43, 44 is ruptured. Moreover, both terminal pieces 54b, 57c can be precisely located at predetermined positions with ease thanks to the insulating tape 58 which is a both-sided adhesive tape.

Figure 11:
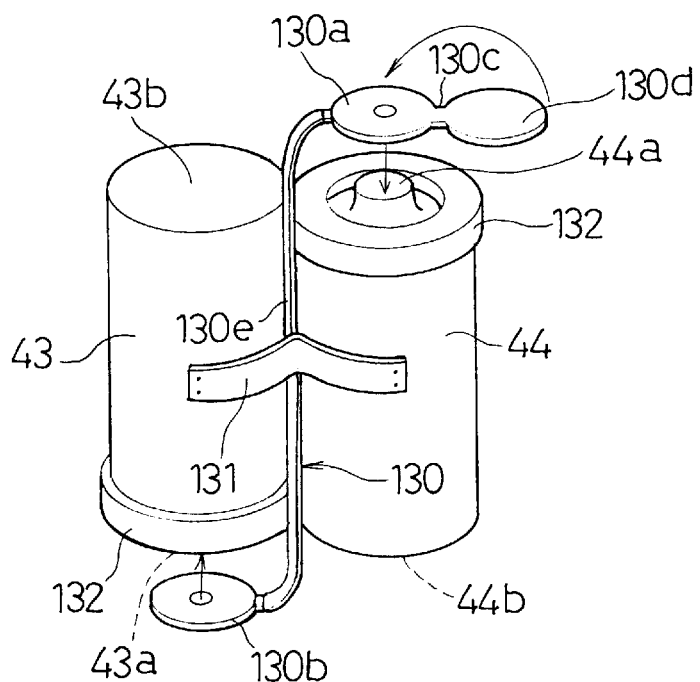
FIG. 11 is a perspective view showing a second construction for connecting and fixing two cylindrical cells in parallel in the packed battery according to the third embodiment of the present invention.

FIG. 11 is a perspective view of a packed battery according to the third embodiment, showing another construction for fixing two cylindrical cells 43, 44 that are connected in parallel and arranged at predetermined positions relative to each other such that the positive and negative terminals are juxtaposed with each other on an identical plane at one end of the cells. In this case, the two cells 43, 44 are not covered with an outer tube but given the same reference numerals as those shown in FIG. 9, since they have the same functions and dimensions. These unjacketed cells 43, 44 can be obtained through production steps of the cells that are normally covered with outer labels before being sold on the market.

The fixing and connecting mechanism of cells comprises a positive connecting terminal plate 130, negative connecting plate 131, and an insulating cap 132. The positive connecting terminal plate 130 has connector pieces 130a, 130b that are respectively joined to the positive terminals 43a, 44a of each cell 43, 44 by spot welding, a terminal piece 130d formed to one of the connector pieces 130a via a bent portion 130c, and an interconnecting line 130e for electrically connecting both of the connector pieces 130a, 130b. The interconnecting line 130e is covered with an insulating cover tube. The negative connecting plate 131 is simply of conductive plate material. The insulating cap 132 is provided for preventing short-circuit between both cells 43, 44.

The cells 43, 44 are respectively provided with a resin insulating cap 132 fitted to the outer periphery of the cell casing in the vicinity of each positive terminal 43a, 44a, and are arranged parallel to each other with their respective positive terminals 43a, 44a and negative terminals 43b, 44b facing opposite directions. The insulating cap 132 of each cell 43, 44 contacts the cell casing of the adjacent cell. The pair of connector pieces 130a, 130b of the positive connecting terminal plate 130 are then spot-welded to each positive terminal 43a, 44a of the cells 43, 44 for achieving electrical connection between both positive terminals 43a, 44a. The negative connecting plate 131 is affixed to the cells 43, 44 such as to bridge their cell casings that are not covered with an outer tube, thereby electrically connecting the negative terminals 43b, 44b through the cell casings. The negative connecting plate 131 may be fixed to the cell casing by any of welding, soldering, or bonding with a conductive adhesive. Finally, the terminal piece 130d is bent over at the bent portion 130c so as to overlap the connector piece 130a, whereby the traces of spot welding in the connector piece 130a are covered by the terminal piece 130d.

With this fixing and connecting mechanism, positive and negative terminals can be arranged on an identical plane, while two unjacketed cells 43, 44 disposed parallel to each other with their terminals facing opposite directions are connected in parallel. That is, the terminal piece 130d lends itself to the positive electrode terminal, while the negative electrode terminal is the negative terminal 43b itself of one cell 43.

Figure 12:
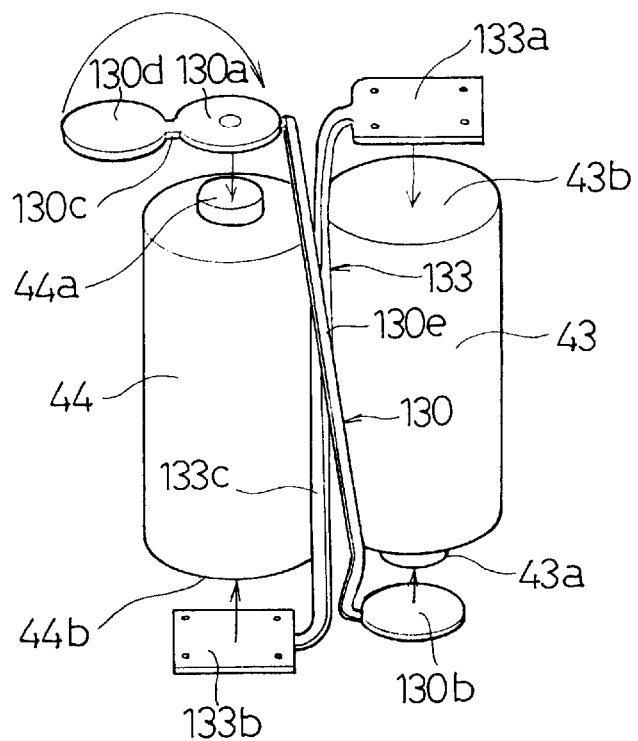
FIG. 12 is a perspective view showing a third construction for connecting and fixing two cylindrical cells in parallel in the packed battery according to the third embodiment of the present invention.

FIG. 12 is a perspective view of a packed battery according to the third embodiment, showing yet another construction for fixing two cylindrical cells 43, 44 that are connected in parallel and arranged at predetermined positions relative to each other such that the positive and negative terminals are juxtaposed with each other on an identical plane at one end of the cells. The two cells 43, 44 in this construction are covered with an outer tube. This fixing and connecting mechanism of cells comprises the same positive connecting terminal plate 130 as the one described above, and a negative connecting terminal plate 133 comprising a pair of rectangular connector pieces 133a, 133b connected via an interconnecting piece 133c.

The two cells 43, 44 are arranged parallel to each other with their respective positive terminals 43a, 44a and negative terminals 43b, 44b facing opposite directions. The connector-pieces 130a, 130b of the-positive connecting terminal plate 130 are respectively joined to the positive terminals 43a, 44a of each cell 43, 44 by spot welding for electrically connecting the positive terminals 43a, 44a. Next, the pair of connector pieces 133a, 133b of the negative connecting terminal plate 133 are joined to each of the negative terminals 43b, 44b of the cells 43, 44 at the periphery at four locations by spot welding for electrically connecting the negative terminals 43b, 44b. Finally, the terminal piece 130d of the positive connecting terminal plate 130 is bent over at the bent portion 130c so as to overlap the connector piece 130a, whereby the traces of spot welding in the connector piece 130a are covered by the terminal piece 130d. The connector piece 133a of the negative connecting terminal plate 133 needs not be covered, since the spot welding is performed at locations in the four corners of the square connector piece 133a and thus the traces of the spot welding are not exposed to the outside when assembled to the packed battery.

With this fixing and connecting mechanism, both of the terminal pieces 130d and 133a that will function as the positive and negative terminals can be arranged on an identical plane, while two cells 43, 44 disposed parallel to each other with their terminals facing opposite directions are connected in parallel. Since both cells 43, 44 are covered with an outer tube in this mechanism, the interconnecting line 130e of the positive connecting terminal plate 130 needs not be covered with an insulating material.

Figure 13:
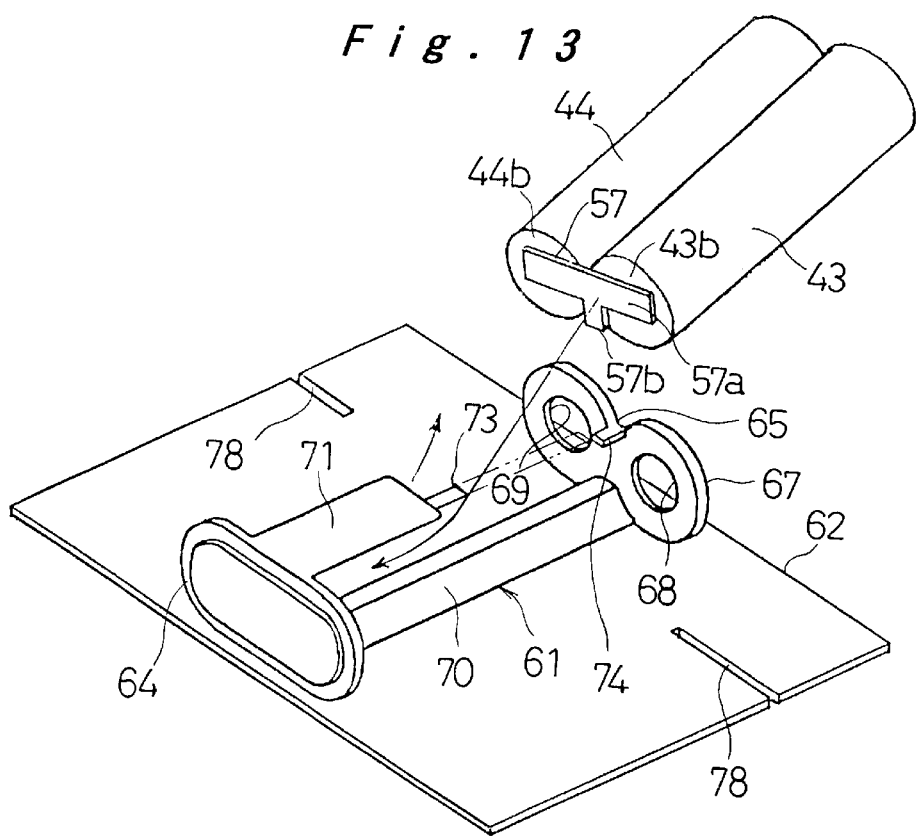
FIG. 13 is a perspective view showing a process step of wrapping an outer label around two cylindrical cells connected in parallel and mounted in the frame body in the third embodiment of the present invention.
Figure 14A:
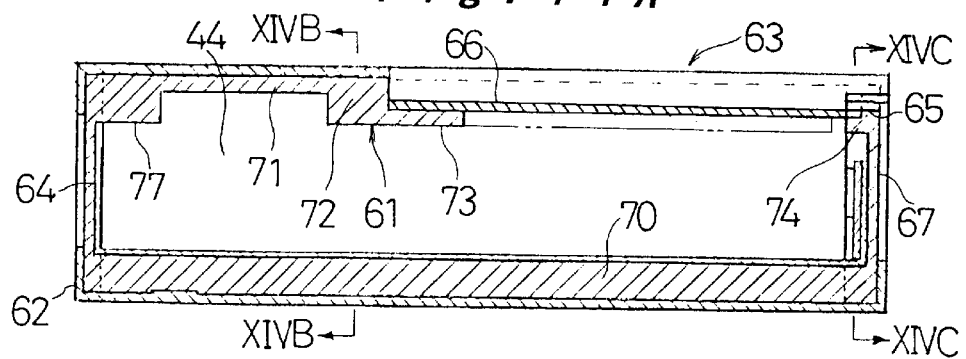
FIG. 14A is a longitudinal cross section.
Figure 14B:
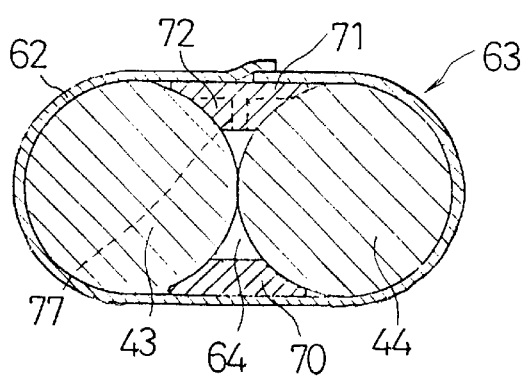
FIG. 14B is a cross section at XIVB—XIVB of FIG. 14A.
Figure 14C:
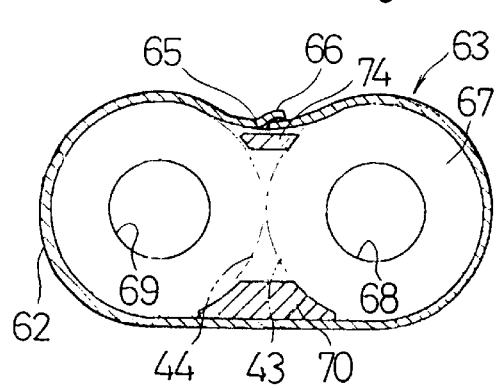
FIG. 14C is a cross section at XIVC—XIVC of FIG. 14A, showing the packed battery according to the third embodiment of the present invention.

Next, the construction of the packed battery according to the third embodiment in which two cells 43, 44 are secured in parallel connection using any of the above described fixing and connecting mechanisms will be described. By way of example, one case in which two cells 43, 44 are joined together with the first fixing and connecting mechanism described above will be explained. The two cells 43, 44 connected in parallel and secured together are mounted onto a frame body 61 that is formed in one-piece of ABS resin as shown in FIG. 13, and an electrically insulating outer label 62 is wrapped around the cells, thereby completing a parallel-connected packed battery 63 as shown in FIGS. 14A–14C.

Similarly to the frame body 20 in the first embodiment, the frame body 61 comprises a first end face cover 64 of ellipsoidal shape, a second end face cover 67 substantially in the form of letter B having a pair of terminal windows 68, 69 and a dent 65 in the middle on one side thereof, a connecting bar 70 that connects middle portions on one side of each of the end face covers 64, 67 opposite and spaced at a distance corresponding to the length of the cylindrical cells 43, 44, and a retaining piece 71 that projects parallel to the connecting bar 70 from the middle portion on one side of the first end face cover 64 from the opposite side from the connecting bar 70, all of which are formed integrally.

In addition to the above, the frame body 61 comprises a partition boss 72 that projects at the distal end on the underside of the retaining piece 71, a first support piece 74 that extends from the partition boss 72 parallel to the connecting bar 70, a second support piece 74 that projects from the dent 65 of the second end face cover 67 toward the first end face cover 64, and a partition piece 77 that projects at the proximal end on the underside of the retaining piece 71, all of which are monolithically formed. The connecting bar 70 has a cross section of substantially trapezoidal shape so that it can fit in a concavity formed between the two adjacent cylindrical cells on one side (lower side in the figure). The retaining piece 71 is formed thinner than the retaining piece 24 of the frame body 20 in the first embodiment, and its partition boss 72 has a cross section of substantially trapezoidal shape so that it can fit in a concavity formed between the two adjacent cylindrical cells on the other side (upper side in the figure), as shown in FIG. 14B.

Meanwhile, the outer label 62 has a length slightly greater than the length of the frame body 61 and a width large enough to wrap around the entire surface of the frame body 61 and the two cells 43, 44 held therein. The outer label 62 is made of heat-sensitive or heat-shrinkable sheet such as PET and is provided with slits 78 on opposite lateral sides at a location between the retaining piece 71 and the first support piece 73.

The two cells 43, 44 secured in parallel connection are mounted to the frame body 61 by being inserted between the connecting bar 70 and the retaining piece 71 with the connector piece 57b of the negative connecting terminal plate 57 towards the frame body 61, as shown in FIG. 13. At this time, both cells 43, 44 push the first support piece 73 and the retaining piece 71 upwards as shown by an arrow as they are inserted, causing the first end face cover 64 to warp sidewards and the retaining piece 71 to slightly deform upwards. If the first support piece 73 is made long as shown in dotted lines, it exhibits sufficient resiliency to warp outwards.

Thus both cells 43, 44 are fitted between both end face covers 64, 67 smoothly. The partition boss 72 and the connecting bar 70 with trapezoidal cross sections respectively fit into the upper and lower concavities formed by the outer peripheries of two cells 43, 44. Accordingly, the cells 43, 44 are sandwiched between the partition boss 72 and the connecting bar 70 from upper and lower sides and are thereby held in the frame body 61 at predetermined positions relative to each other. Furthermore, the second support piece 74 is located between the positive and negative terminal pieces 54b, 57c of the cells, thereby preventing accidental short-circuit therebetween.

The outer label 62 made of an electrically insulating resin film is wrapped around the cells 43, 44 and the frame body 61, after which hot air of about 150° C.–200° C. is blown to the upper and lower sides thereof, so as to shrink and fit to the external surfaces of the cells 43, 44 and the frame body 61. The cells 43, 44 are then pressed with a roller from both lateral sides (not shown) for flattening out any wrinkles or air-babble bosses. Thereby, both cells 43, 44 and the frame body 61 are firmly secured together by the outer label 62, completing the packed battery 63. In this packed battery 63, the positive connecting terminal piece 54b connecting the positive terminals 43a, 44a of both cylindrical cells 43, 44, and the negative connecting terminal piece 57c connecting the negative terminals 43b, 44b are exposed to the outside through each terminal window 68, 69 in the second end face cover 67, so as to be connectable to the terminals of an electric appliance.

According to the packed battery 63 described above, two cells 43, 44 can be joined together in a simple process step using positive and negative connecting terminal plates 54, 57 and insulating tape 58, that are all simply constructed, low-cost members, by which both positive and negative terminal pieces 54b, 57c can be arranged on an identical plane even though the cells are connected in parallel. On the contrary, in a conventional packed battery of parallel connection, wiring is provided to the positive and negative terminals of two cells, and further, the wires are covered with resin or a heat-shrinkable tube. The wiring members and external terminals are separately provided, whereby its internal construction is relatively complicated.

Moreover, while the cells 43, 44 are partly exposed in the packed batteries 52, 53 of the first and second embodiments, the outer label 62 is wrapped around the entire surfaces of the cells 43, 44 and the frame body 61 in this embodiment, in which an indentation 66 having a cross section corresponding to the dent 65 is formed in a portion between the tip of the retaining piece 71 and the second end face cover 67. This indentation 66 can be formed thanks to the pair of support pieces 73, 74 that are provided at locations such as to support the ends of the outer label 62. Both lateral side edges of the outer label 62 can thereby be overlapped upon one another, making it possible to affix simply by blowing hot air, as it is not necessary to apply an adhesive on the entire surface of one face of the outer label 51 as in the first or second embodiment.

The above described packed battery 63 can be constituted in two different types, with 1.5V output voltage using two 1.5V cells and 3V output voltage using two 3V cells. Features for distinguishing these different output voltage specifications are provided in the form of the differences in depth and length of the indentation 66. Specifically, the indentation 66 in the packed battery 63 of 1.5V output voltage specification is made deeper and shorter than that of the packed battery of 3V output voltage specification, while the thickness of both types of packed batteries is the same. The relationship between these two types of packed batteries and the battery holders of electric appliances to which each of these packed batteries is used will be explained below.

FIG. 15 is a perspective view showing the packed battery 63 and a battery holder 80 of an electric appliance 79. The shape of a battery insertion hole 81 of the battery holder 80 is formed in conformity with the external configuration of the cross section of the packed battery 63, and it is identical for both types of packed batteries. Positive and negative contact terminals 82, 83 are provided at the end in the interior of the battery holder 80 for contacting in electrical connection with the positive and negative connecting terminal pieces 54b, 57c of the packed battery 63 that project through the terminal windows 68, 69. Also provided in the interior of the battery holder 80 is a guide rail 84 having a substantially trapezoidal cross section with the depth and length corresponding to the indentation 66 of the packed battery, extending from between the terminals 82, 83 toward the battery insertion hole 81.

If a packed battery of 3V output voltage specification is inserted by mistake into the electric appliance 79 that requires 1.5V packed battery, the second end face cover 67 having the dent 65 of smaller depth than that of the 1.5V packed battery abuts the distal end of the guide rail 84, thereby preventing the packed battery from being inserted into the battery holder 80. It is thus impossible to mount a packed battery with a 3V output voltage into an electric appliance that is driven by a 1.5V power source, and the user can readily realize the mistake and will stop attempting the mounting thereof immediately. It can be made certain that the electric appliance is prevented from being damaged by misuse of a 3V packed battery.

On the other hand, if a packed battery of 1.5V output voltage specification is inserted by mistake into the electric appliance 79 that requires 3V packed battery, the guide rail 84 having a slightly greater length than that of the battery holder 80 for a 1.5V packed battery will stop the packed battery when the partition boss 72 at the tip of the retaining piece 71 of the packed battery contacts the distal end of the guide rail 84. Therefore the packed battery cannot be fully inserted into the battery holder 80. It is thus impossible to mount a packed battery with a 1.5V output voltage into an electric appliance that is driven by a 3V power source, and the user can readily realize the mistake and will stop attempting the mounting thereof immediately. It can be made certain that a trouble wherein the electric appliance does not operate normally can be prevented. Moreover, both of the above described packed batteries have also a feature for preventing reverse insertion thereof, since they are not provided with a dent 30 in their first end face covers 64, and therefore allow themselves to be inserted only from the side of the second end face cover 67.

Furthermore, in the electric appliance 79 shown in FIG. 15, of which drive power source is 3V, another pair of positive and negative contact terminals 88, 89 are provided to the inner side of a lid 87 of the battery holder 80. This makes it possible to use two 1.5V dry cells 90 as a substitute for the 3V parallel-connection packed battery. That is, two dry cells 90 can be inserted in an arrangement shown by imaginary lines in the figure into the battery holder 80, and the battery insertion hole 81 is closed with the lid 87. The two 1.5V dry cells 90 are then serially connected, generating 3V drive voltage.

Figure 16:
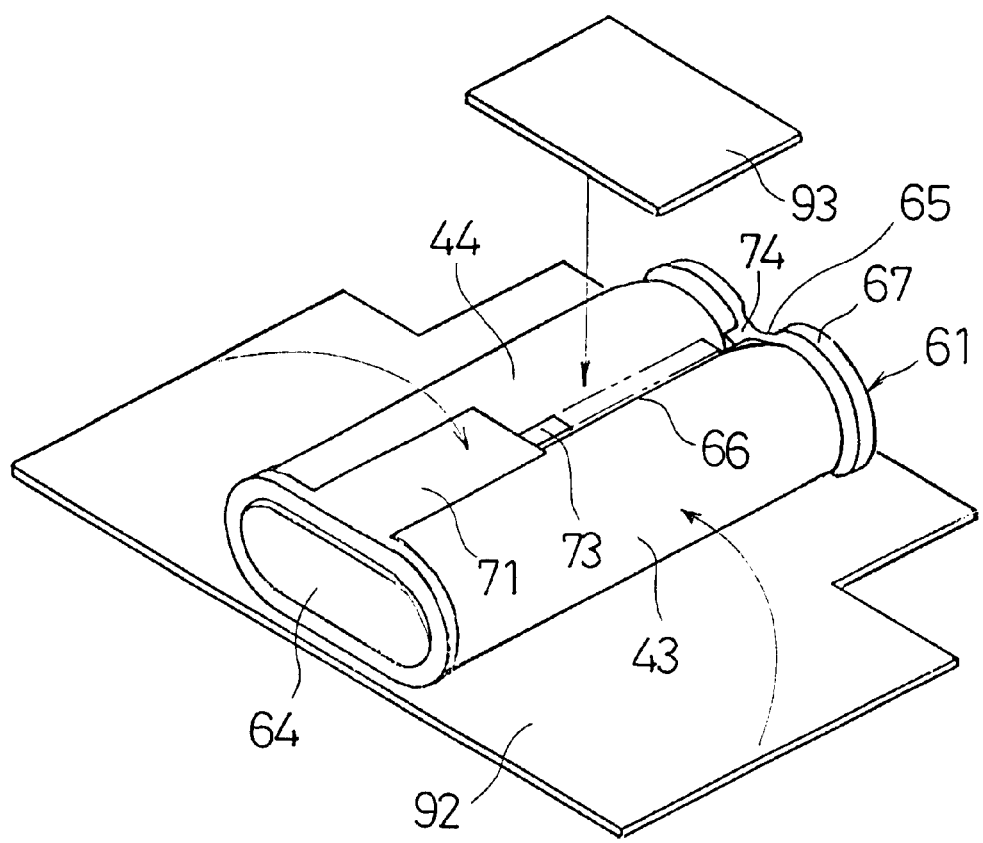
FIG. 16 is a perspective view showing a modified example of the packed battery according to the third embodiment in a fabrication process step.
Figure 17:
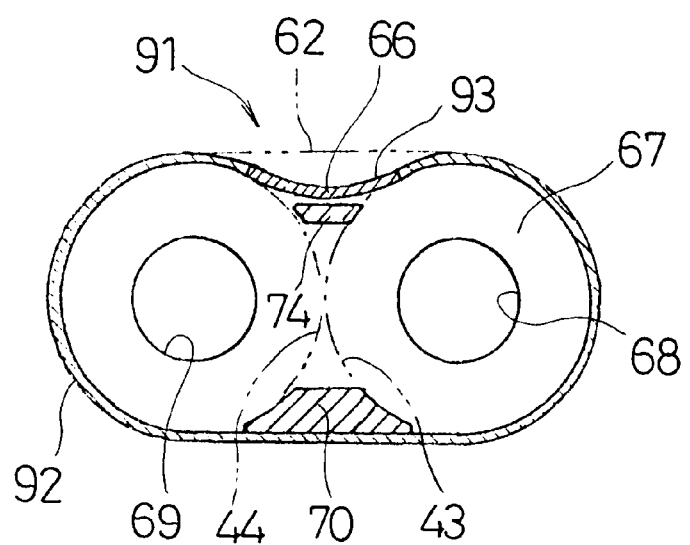
FIG. 17 is a cross section in the widthwise direction of the packed battery of FIG. 16.

FIG. 16 is a perspective view showing one production process step of a packed battery 91, a modified form of the packed battery 63 of the third embodiment, and FIG. 17 is a cross section in widthwise direction of this packed battery 91. The difference between this packed battery 91 and the packed battery 63 of the third embodiment lies in that the two cells 43, 44 and the frame body 61 are covered with two separate outer labels 92, 93. The construction of fixing and connecting two cells in parallel using positive and negative connecting terminal plates 54, 57 and insulating tape 58 and mounting them into the frame body is identical to that of the third embodiment.

A first outer label 92 is made of the same material as that of the outer label 62 in the third embodiment such as, for example, a heat-shrinkable sheet obtained by subjecting PET to a stretching process. Similarly to the outer label 51 in the first and second embodiments, the first outer label 92 is formed in a square convex shape with a portion corresponding to the part between the distal end of the retaining piece 71 and the second end face cover 67 having a smaller width than the other part. On the other hand, the second outer label 93 is made of a non-heat shrinkable material such as non-stretch-processed PET and is formed rectangular in shape such as to cover the part of the cells 43, 44 that is not covered by the first outer label 92. Accordingly, this packed battery 91 has an indentation 66 where the second outer label 93 is affixed, while the other external surfaces of the packed battery are covered by the first outer label 92, as can be seen from FIG. 17.

It is preferable to wrap the entire surface of the packed battery with a heat-sensitive or heat-shrinkable outer label 62 as in the third embodiment in terms of its integrality. However, should the packed battery be kept under a high temperature atmosphere of about 100° C., the thermal shrinkage of the outer label 62 is accelerated, because of which there is a risk that the outer label 62 in the portion of the indentation 66 may be separated from the cell surfaces and become flat, as shown by two-dotted chain lines in FIG. 17 for the purpose of comparison. The indentation 66 may disappear because of deformation of the outer label, in which case there is no feature for preventing misuse of packed batteries, or even, the packed battery cannot be inserted into the corresponding battery holder 80.

Contrary to the above, the indentation 66 in the packed battery 91 can be maintained even if the packed battery is kept under a high temperature atmosphere of about 100° C., since the second outer label 93 is free from deformation. Apart from this, if, instead of the above-mentioned non-heat shrinkable label, a material that shrinks at a predetermined temperature is used for the second outer label 93 in the packed battery 91, the second outer label 93 can be utilized as a temperature sensor of the packed battery 91, by which a packed battery that has been exposed in an atmosphere of a predetermined temperature can be detected.

Figure 18:
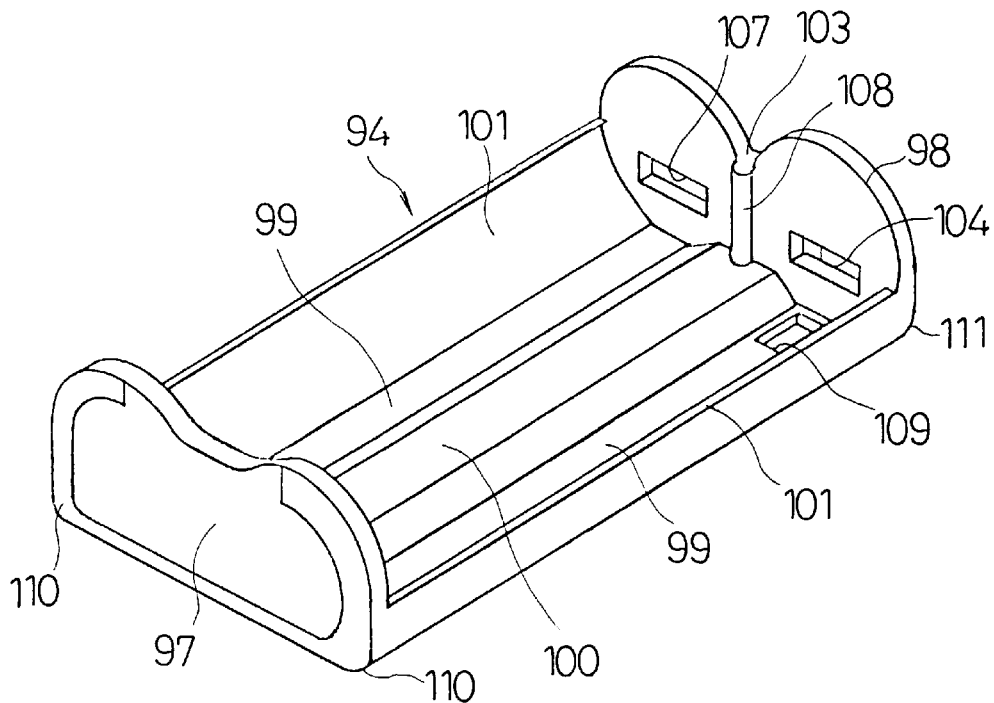
FIG. 18 is a perspective view showing a cell casing from one end thereof that is used in the packed battery according to a fourth embodiment of the present invention.
Figure 19:
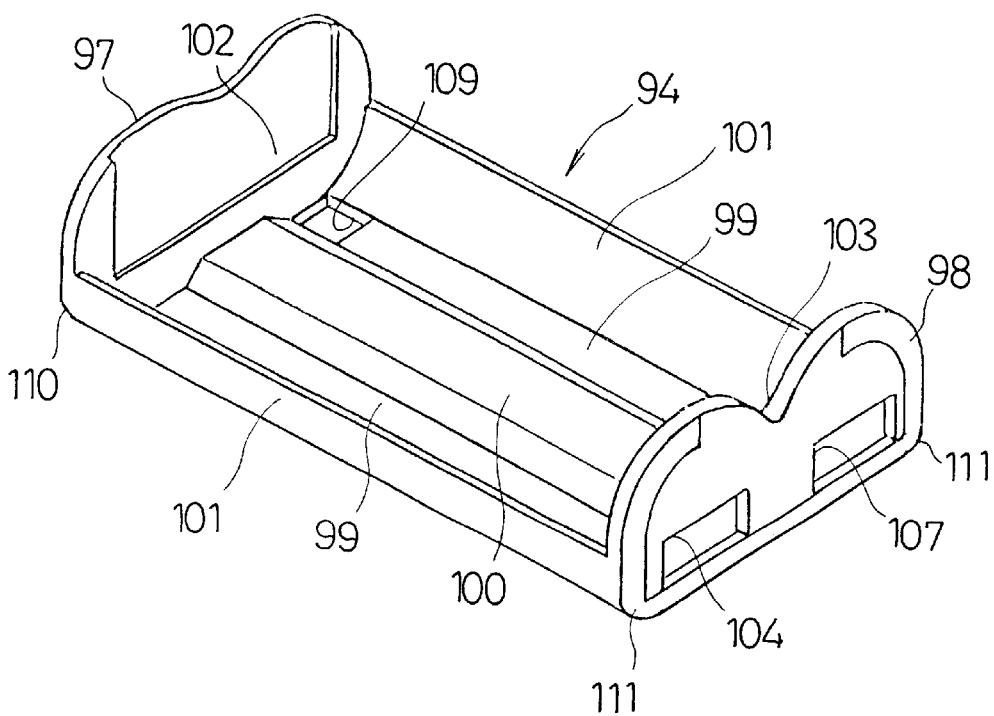
FIG. 19 is a perspective view showing the cell casing of FIG. 18 from the other end thereof.

FIG. 18 is a perspective view showing from one end a cell casing 94 used in a packed battery according to a fourth embodiment of the present invention, and FIG. 19 is a perspective view showing the same cell casing 94 from the other end. The cell casing 94 has a first and a second end face covers 97, 98, bottom wall 99, partition boss 100, and side walls 101 that are all monolithically formed of, for example, ABS resin, in such a shape that it can contain two cylindrical cells therein. This construction is identical to the cell casing 31 used for the packed battery 53 of the second embodiment, and the difference lies in that, the pair of terminal windows 104, 107 are formed in rectangular shape, and that the cell casing 94 has a partition piece 108 in the second end face cover 98 and a pair of through holes 109, 109 in the bottom wall 99 diagonally to each other.

In the middle in the widthwise direction of the bottom wall 99, the rail-like partition boss 100 is formed to protrude upwardly along a lengthwise direction. The bottom wall 99 has a length and width such that two parallel-arranged and closely contacted cylindrical cells can be placed thereon on both sides of the partition boss 100. The partition boss 100 has a trapezoidal cross-section so that it can fit in the concavity formed by the outer peripheries of two closely contacted cylindrical cells on the under side. The cylindrical cells are thus respectively held on both sides with the partition boss 100 and the both side walls 101.

The first end face cover 97 is formed substantially in the shape of letter D so that it can cover both of the end faces of two adjacent cylindrical cells juxtaposed in close contact with each other, and is provided with stepped portion 102 that receives and retains a terminal plate to be described later. The second end face cover 98, while it is shaped such as to cover the both end faces of two cylindrical cells similarly to the first end face cover 97, has its one longer side (upper side in the figure) shaped in conformity with the external shape of two cylindrical cells with a dent 103 formed in the middle. The second end face cover 98 further has a pair of rectangular terminal windows 104, 107 at locations opposite and offset downwards from the center of the end faces of both cylindrical cells placed on the bottom wall 99. A distinguishing feature of this cell casing 94 as compared to the frame body 61 of the third embodiment is that the first and second end face covers 97,98 are formed with square edges 110, 111 protruded respectively at both ends of their linearly shaped lower longer sides.

The partition piece 108 extends vertically upwards from the upper surface of the partition boss 100 in the middle between the terminal windows 104, 107 on the inner side of the second end face cover 98. The pair of through holes 109 are formed in the bottom wall 99 at the diagonally opposite ends on both sides of the partition boss 100, these being provided for the purpose of receiving annular projections in the sealing portion of the cells mounted in this cell casing 94, which will be described later.

Figure 20:
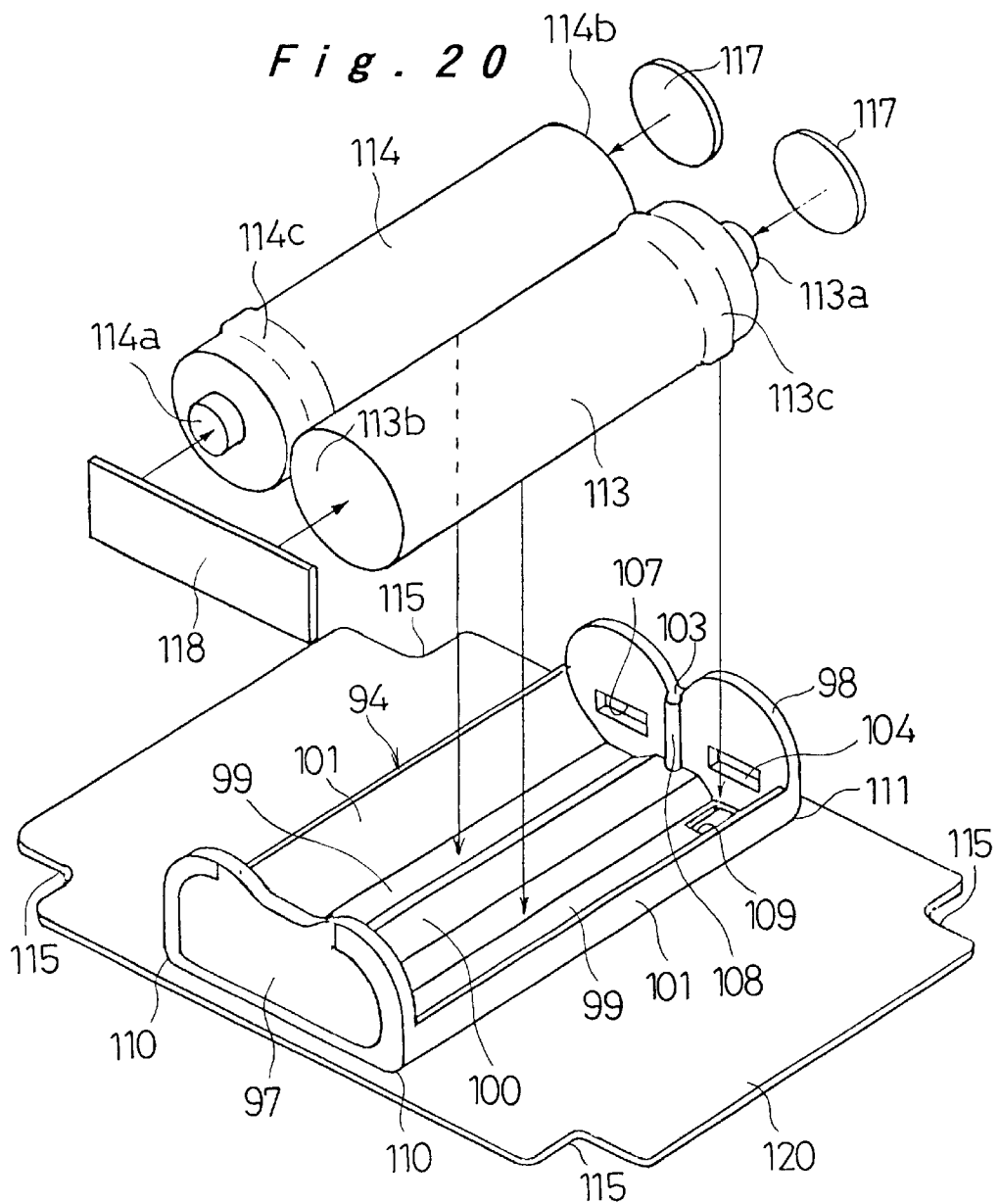
FIG. 20 is a perspective view showing a fabrication process step of the packed battery according to the fourth embodiment using the cell casing of FIG. 18.
Figure 21:
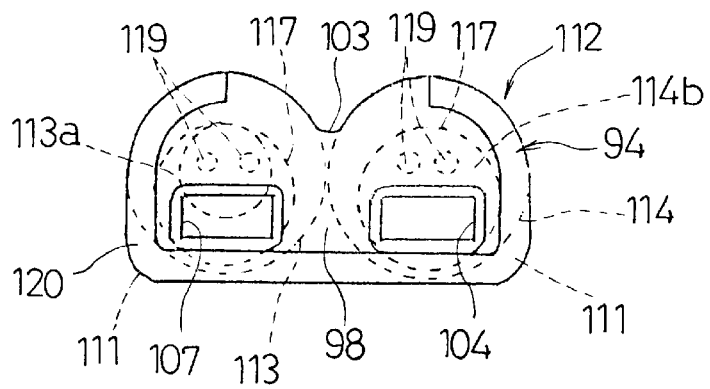
FIG. 21 is a side elevation view showing the packed battery of FIG. 20.

FIG. 20 is a perspective view showing a production process step of the packed battery of the fourth embodiment using the above-described cell casing 94, and FIG. 21 is a side elevation view showing a finished packed battery 112. This cell casing 94 is used for constituting a packed battery 112 in which two cylindrical lithium cells 113, 114 are connected in series. Specifically, the cylindrical lithium cells 113, 114 used in this packed battery 112 have outwardly protruding annular projections 113c, 114c formed by their sealing portions on the external surface in the vicinity of their positive terminals 113a, 114a.

Next, the fabrication process steps of the packed battery 112 constituted with the cell casing 94 will be described. First, two cylindrical lithium cells 113, 114 are arranged side by side in close contact with their respective longitudinal axes parallel to each other and with their respective positive and negative terminals 113a, 114a, 113b, 114b arranged opposite from each other such that both of their end faces are positioned on an identical plane. Two identical circular terminal plates 117, 117 are respectively welded to the positive terminal 113a of the cell 113 and the negative terminal 114b of the cell 114 adjacent to each other by spot welding using welding electrodes (not shown), while a connector piece 118 of rectangular shape is welded at its both ends to the positive terminal 114a and the negative terminal 113b juxtaposed at the other end of the cells by spot welding using welding electrodes. Thereby, both cells 113, 114 are connected in series, and joined together in a predetermined positional relationship with each other.

The terminal plates 117 welded to each of the positive and negative terminals 113a, 114b are formed in an identical circular, flat shape, allowing themselves to be fabricated at a low cost. Material cost can be thereby reduced. Furthermore, since the circular terminal plate 117 needs not be positioned in a certain direction, the welding can be performed at a high speed.

The cells 113, 114 joined together are placed onto the bottom wall 99 on both sides of the partition boss 100 in the cell casing 94. Prior to this, a cyanoacrylate resin adhesive of non-whitening type is applied to the middle portion of the bottom wall 99 in its lengthwise direction. Thus when the cells 113, 114 are inserted into the cell casing 94, they are bonded and joined thereto. By using a cyanoacrylate resin adhesive of a type in which no vapor whitening occurs in the process of joining the cells 113, 114 with the cell casing 94, damage to the external appearance of the packed battery 112 by the whitened adhesive can be prevented.

After being inserted in the cell casing 94, each of the cells 113, 114 is stably held by the bottom wall 99, the partition boss 100, and the side walls 101. The connector piece 118 fits into the stepped portion 102 in the first end face cover 97, while the annular projections 113c, 114c on each of the cells 113, 114 fit into the through holes 109, whereby the retaining of the cells 113, 114 in the cell casing 94 is further made stable. Each terminal plate 117 is exposed to the outside through the terminal windows 104, 107. The partition piece 108 provided in the second end face cover 98 between the terminal windows 104, 107 prevents the pair of terminal plates 117 from being accidentally short-circuited during the fabrication process.

The terminal plates 117 are spot-welded at two locations to the end faces of the cells 113, 114 such as to be offset from the center of the cells as shown in FIG. 21 toward one side where the terminal windows 104, 107 of the second end face cover 98 are located. Therefore, the opening of the terminal windows 104, 107 is entirely shut with the terminal plates 117, while the traces of spot-welding are covered by the second end face cover 98, since they are positioned substantially in the middle of the end faces of the cells 113, 114.

A heat-sensitive or heat-shrinkable outer label 120 is then wrapped around and bonded to the exterior surface of the cell casing 94 and the cells 113, 114, whereby a packed battery 112 is completed, in which two cells 113, 114 are connected in series and securely joined together. The process step of wrapping the outer label 120 can be easily carried out, since both of the cells 113, 114 and the cell casing 94 are joined together by the adhesive in advance. If the cells 113, 114 and the cell casing 94 are not affixed to each other, the process of wrapping the outer label 120 will be more complicated, as it is necessary to retain both of the cells not to fall off the cell casing 94.

Figure 22:
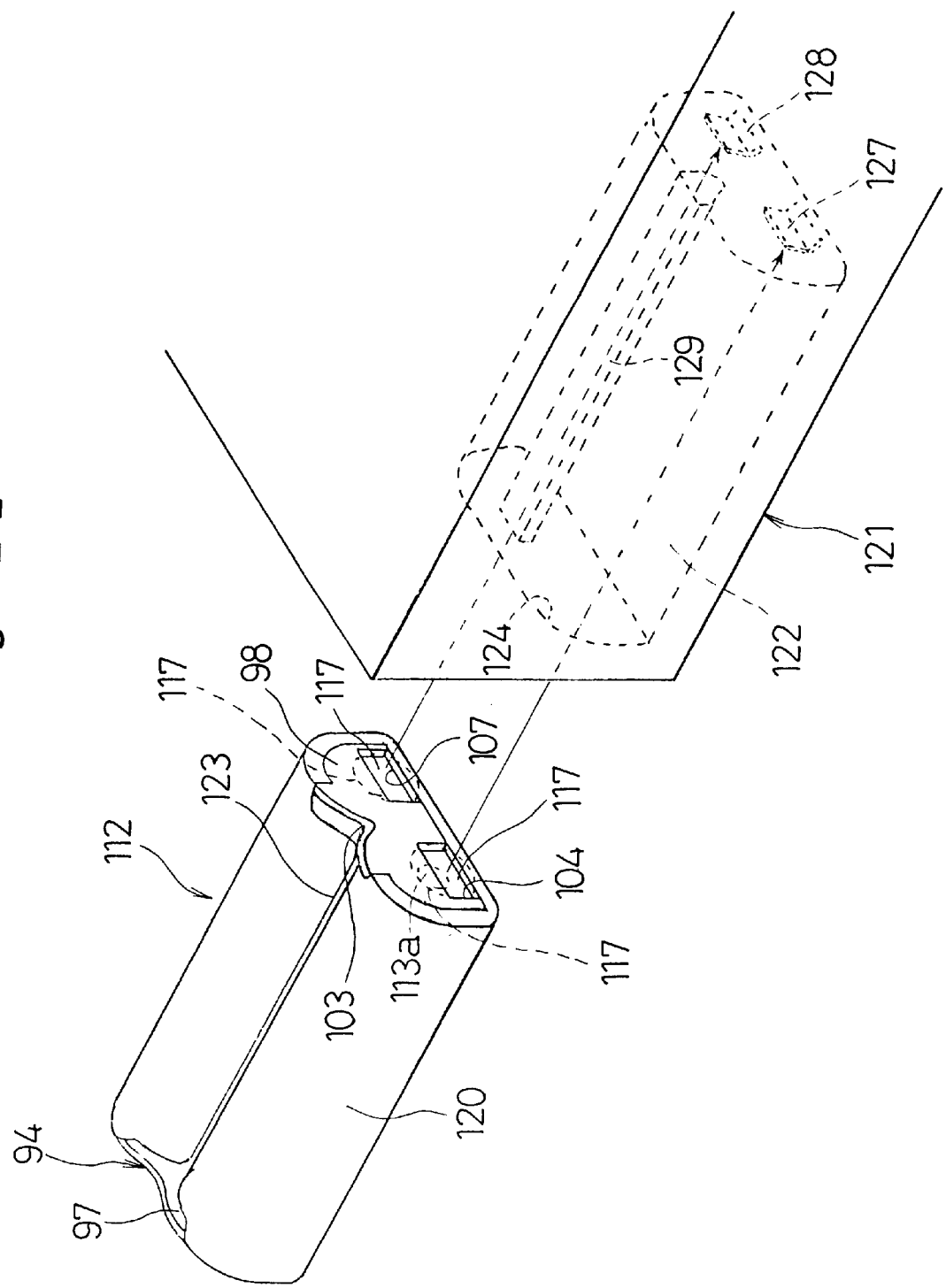
FIG. 22 is a perspective view showing the packed battery of FIG. 20 and a battery holder.

A heat-sensitive, or a heat-shrinkable material such as PET is used for the outer label 120. The outer label 120 has a length slightly greater than that of the cell casing 94 and a width large enough to wrap around the cell casing 94 and two cells 113, 114 mounted thereon with square cutouts 115 at four corners as shown in FIG. 20. FIG. 22 is a perspective view of the packed battery 112 and a battery holder 122 of an electric appliance 121. As shown in the figure, when wrapped around the cells 113, 114, lateral side edges of the outer label 120 abut with each other along the entire length of the cells, forming an indentation 123 in the middle in the widthwise direction of the packed battery 112.

In FIG. 22, the battery insertion hole 124 of the battery holder 122 has an opening shaped in conformity with the cross section of the packed battery 112. A positive and negative contact terminals 127, 128 are provided at the end in the interior of the battery holder 122 for contacting in electrical connection with the positive and negative terminal plates 117 of the packed battery 112 through the terminal windows 104, 107. Furthermore, a guide rail 129 having a cross section with a depth and length corresponding to the depth and length-of the indentation 123 in the packed battery 112 is provided from between the terminals 127, 128 at the innermost end toward the battery insertion hole 124 in the battery holder 122.

The above described packed battery 112 can be constituted with two 3V cells so as to have a 6V output voltage, but is distinguishable from the packed batteries 52, 53, 63 of the foregoing first to third embodiments in that the terminal windows 104, 107 are provided at positions offset from the center of each cell 113, 114. Therefore, even if this packed battery 112 with 6V output voltage specification is inserted by mistake into the battery holder of an electric appliance that requires any of 3V packed batteries 52, 53, 63 of the first to third embodiments as a power source, the terminal plates 117 will not be connected to the terminals in the battery holder. Accordingly, damage to the electric appliance caused by misuse of 6V packed battery can be prevented.

Furthermore, the presence of the guide rail 129 having the length extending to the entire length of the battery holder 122 makes it impossible to insert either of the packed batteries 52, 63 of the first and third embodiments into the battery holder 122 of the electric appliance 121 that needs the 6V packed battery 112 of this embodiment. Also, even if the packed battery 53 of the second embodiment is forcibly inserted into the battery holder 122, the terminals of the cells will not be connected to the terminals inside of the battery holder 122. Therefore, in either case, the trouble of the electric appliance malfunctioning because of the misuse of a packed battery having an output voltage lower than 6V is prevented.

The packed battery 112 can be constituted with a 3V output voltage specification if two 1.5V cylindrical cells are used, and with a 6V output voltage specification if two 3V cylindrical cells are used. In the case of fabricating and selling two types of this packed battery 112 with different output voltage specifications, misuse is prevented by providing a difference in depth of the indentation 123. That is, the depth of the indentation 123 of the packed battery with 6V output voltage specification is set smaller than that of the packed battery of 3V output voltage specification. The cross section of the guide rail 129 is accordingly changed corresponding to the shape of the indentation 123 of each type of the packed battery 112. Thereby, insertion of 6V packed battery into the battery holder of an electric appliance driven with 3V power is prevented by the guide rail 129.

INDUSTRIAL APPLICABILITY

As described above, the packed battery according to the present invention enables a plurality of cells to be retained in a predetermined positional relationship with each other using an integrally formed frame body or cell casing, whereby the number of components is decreased, and the assembling process is simplified. The overall production cost can be reduced, and the yield of packed battery can be increased. The present invention is thus useful in the field of manufacturing packed batteries.

What is claimed is:

1. A packed battery, comprising:
    a plurality of cells joined together in series- or parallel-connection and arranged with their axes parallel to each other and their external surfaces in proximity to or in contact with each other, and with their juxtaposed electrode terminals electrically connected to each other at least at one end with a connector piece; and a frame body into which said cells are mounted, including a pair of first and second end face covers that respectively cover the entire surface of end faces of the adjacent cells at both ends, a connecting bar for connecting said pair of end face covers opposed to each other at a space corresponding to a length of the cells, all of which end face covers, and connecting bar are formed in one piece, wherein said cells are held at their lengthwise ends by the end face covers and at their widthwise sides by the connecting bar, thereby being retained in the frame body, and wherein a heat-sensitive or heat-shrinkable outer label is wound around and bonded to the entire exterior surface of the cells and the frame body.

2. The packed battery according to claim 1, said packed battery further comprising a retaining piece that is shorter than the connecting bar and is provided on the first end face cover to protrude parallel to the connecting bar, wherein the first end face cover has a thin portion in which the connector piece attached to one end of the cells fits in; the second end face cover has a plurality of terminal windows for allowing the electrode terminals of the cells to be exposed to the outside; the connecting bar and the retaining piece both have a cross section such that they can fit in a concavity between the juxtaposed cells; and the retaining piece has a length $\frac{1}{3}$ to $\frac{1}{2}$ of the connecting bar.

3. The packed battery according to claim 1 wherein the first end face cover is formed ellipsoidal in shape while the second end face cover is formed substantially in the shape of letter B having a dent in conformity with the external shape of one end of the cells joined together, and the dent has a depth that varies corresponding to an output voltage specification of the packed battery.

4. The packed battery according to claim 1, said packed battery further comprising a retaining piece that is shorter than the connecting bar and is provided on the first end face cover to protrude parallel to the connecting bar, wherein the retaining piece has a length that varies corresponding to an output voltage specification of the packed battery.

5. The packed battery according to claim 1 wherein all of the cells are arranged in a same direction with their positive terminals juxtaposed and electrically connected to each other by a positive connector piece welded to the positive terminals, and with their negative terminals electrically connected to each other by a negative connector piece welded to the negative terminals; an insulating tape is affixed on the positive connector piece; a positive terminal piece is electrically connected to the positive connector piece; a negative terminal piece having a same thickness as that of the positive terminal piece is electrically connected to the negative connector piece through an interconnecting member; and the positive terminal piece and the negative terminal piece are bonded on the insulating tape that is affixed on the positive connector piece.

6. The packed battery according to claim 5 wherein the positive terminal piece is integrally formed to the positive connector piece such as to be bendable relative to the positive connector piece, while the negative terminal piece communicates with the negative connector piece in such a manner that the interconnecting member extends from the negative connector piece in an orthogonal direction, and the negative terminal piece is integrally formed to the distal end of the interconnecting member such as to be bendable relative thereto; and the positive terminal piece and the negative terminal piece are respectively bent so as to be bonded on the insulating tape that is affixed on the positive connector piece.

7. The packed battery according to claim 6 wherein an adhesive is applied to both sides of the insulating tape in advance.

8. The packed battery according to claim 1 wherein the cells are arranged in opposite directions, and their respective positive terminals are electrically connected to each other by welding connector pieces of a positive terminal connecting member respectively to each of the positive terminals of the cells, said connector pieces being provided to both ends of an interconnecting line in electrical connection therewith, while respective negative terminals of the cells are electrically connected to each other by welding both ends of a negative terminal connecting member to the negative terminals of each of the cells.

9. The packed battery according to claim 8 wherein the cells are not covered with an outer tube, and the both ends of the negative terminal connecting member are welded to the exterior surface of the cell casing of each cell.

10. The packed battery according to claim 1, said packed battery further comprising a retaining piece that is shorter than the connecting bar and is provided on the first end face cover to protrude parallel to the connecting bar, and wherein the heat-sensitive or heat-shrinkable outer label is wound around and bonded to the entire exterior surface of the cells and the frame body except a part from the distal end of the retaining piece in the first end face cover to the second end face cover.

11. The packed battery according to claim 1, said packed battery further comprising a retaining piece that is shorter than the connecting bar and is provided on the first end face cover to protrude parallel to the connecting bar, wherein the frame body includes a first support piece integrally formed to the distal end of the retaining piece of the first end face cover such as to be stepped and thinner than the retaining piece so as to fit in a concavity between the adjacent cells, and a second support piece integrally formed to the second end face cover opposite the first support piece such as to fit in the concavity between the adjacent cells, while a heat-sensitive or heat-shrinkable outer label is wound around and bonded to the entire exterior surface of the cells and the frame body, the outer label being formed with slits so that it fits to the exterior shape of the cells and the frame body and so that a portion of the outer label corresponding to a part of the cells from the distal end of the retaining piece in the first end cover to the second end face cover is supported by the first support piece and the second support piece.

12. The packed battery according to claim 1, said packed battery further comprising a retaining piece that is shorter than the connecting bar and is provided on the first end face cover to protrude parallel to the connecting bar, wherein a first outer label of heat-shrinkable material is wound around and bonded to the exterior surface of the cells and the frame body except a part from the distal end of the retaining piece in the first end face cover to the second end face cover; and a second outer label of non-heat-shrinkable material is wound around and bonded to the part from the distal end of the retaining piece in the first end face cover to the second end face cover.

13. A packed battery, comprising:
a plurality of cells joined together in series- or parallel-connection and arranged with their axes parallel to each other and their external surfaces in proximity to or in contact with each other, and with their juxtaposed electrode terminals electrically connected to each other at least at one end with a connector piece; and
a cell casing into which said cells are mounted, including a pair of first and second end face covers that respectively cover the entire surface of end faces of the adjacent cells at both ends, a bottom wall that connects said pair of end face covers opposed to each other at a space corresponding to a length of the cells, and a partition boss projected on the bottom wall along a lengthwise direction thereof, all of which end face covers, bottom wall, and partition boss are formed in one piece, wherein said cells are placed upon the bottom wall along the partition boss and held at their lengthwise ends by the end face covers, thereby being retained in the cell casing, and wherein a heat-sensitive or heat-shrinkable outer label is wound around and bonded to the entire exterior surface of the cells and the cell casing.

14. The packed battery according to claim 13 wherein the second end face cover has a plurality of terminal windows for allowing electrode terminals of the cells to be exposed to the outside, and the partition boss has a cross section such that it can fit in a concavity between the juxtaposed cells.

15. The packed battery according to claim 13 wherein the first end face cover is formed substantially in the shape of letter D, while the second end face cover is formed substantially in the shape of letter B having a dent in conformity with the external shape of one end of the cells joined together, the dent having a depth that varies corresponding to an output voltage specification of the packed battery; and both of the end face covers have one linear side where they are connected with each other through the bottom wall, said linear side of the end face covers being formed with square projections at both ends thereof.

16. The packed battery according to claim 13 wherein the cells are arranged in opposite directions; circular terminal plates of identical shape are respectively welded to the electrode terminals juxtaposed to each other at one end of the cells at locations offset from the center of the cells, while the electrode terminals juxtaposed to each other at the other end of the cells are electrically connected with each other by a connector piece welded thereto; and the second end face cover of the cell casing has non-circular terminal windows formed therein at locations opposite each of the circular terminal plates.

17. The packed battery according to claim 16 wherein a partition piece is integrally formed between the terminal windows.

* * * * *